United States Patent
Wang et al.

(10) Patent No.: US 9,391,681 B2
(45) Date of Patent: Jul. 12, 2016

(54) METHOD FOR DETERMINING PRECODING MATRIX INDICATOR, USER EQUIPMENT, AND BASE STATION

(71) Applicant: Huawei Technologies Co., Ltd., Shenzhen, Guangdong (CN)

(72) Inventors: Jianguo Wang, Bonn (DE); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/937,392

(22) Filed: Nov. 10, 2015

(65) Prior Publication Data

US 2016/0065279 A1    Mar. 3, 2016

Related U.S. Application Data

(63) Continuation of application No. PCT/CN2013/075488, filed on May 10, 2013.

(51) Int. Cl.
| | |
|---|---|
| *H04L 23/00* | (2006.01) |
| *H04B 7/04* | (2006.01) |
| *H04L 5/00* | (2006.01) |

(52) U.S. Cl.
CPC ............ *H04B 7/0456* (2013.01); *H04L 5/0048* (2013.01)

(58) Field of Classification Search
CPC .... H04B 7/0634; H04B 7/0639; H04B 7/066; H04B 7/0456; H04L 5/0048
USPC .......... 375/267, 299, 347, 377; 455/101, 132
See application file for complete search history.

(56) References Cited

U.S. PATENT DOCUMENTS

| | | | | |
|---|---|---|---|---|
| 8,599,708 | B2* | 12/2013 | Chen ..................... | H04L 1/0028 370/252 |
| 8,848,817 | B2* | 9/2014 | Onggosanusi ....... | H04B 7/0456 375/267 |
| 2009/0147880 | A1* | 6/2009 | Wennstrom .......... | H04B 7/0634 375/267 |
| 2011/0216846 | A1 | 9/2011 | Lee et al. | |
| 2011/0268207 | A1 | 11/2011 | Choi et al. | |
| 2012/0219042 | A1 | 8/2012 | Onggosanusi et al. | |
| 2014/0086092 | A1 | 3/2014 | Chen et al. | |

FOREIGN PATENT DOCUMENTS

| | | |
|---|---|---|
| CN | 101924606 A | 12/2010 |
| CN | 101931512 A | 12/2010 |
| CN | 102291839 A | 12/2011 |
| CN | 102845009 A | 12/2012 |

* cited by examiner

*Primary Examiner* — Tesfaldet Bocure

(57) ABSTRACT

The present invention provides a method for determining a precoding matrix indicator, user equipment, and a base station. The method includes: receiving a first reference signal set sent by a base station; determining, based on the first reference signal set, one or more intermediate matrices, and reporting, to the base station, a first index used to indicate the intermediate matrix; receiving a second reference signal set sent by the base station; and determining, based on the second reference signal set, a precoding matrix, and reporting, to the base station, a precoding matrix indicator used to indicate the precoding matrix, where the precoding matrix is a product W of two matrices $W_1$ and $W_2$, and $W=W_1W_2$, where $W_1$ is a block diagonal matrix, $W_1=\text{diag}\{X_1,X_2\}$. In this way, transmission performance of an active antenna system can be improved.

20 Claims, 6 Drawing Sheets

US 9,391,681 B2

METHOD FOR DETERMINING PRECODING MATRIX INDICATOR, USER EQUIPMENT, AND BASE STATION

CROSS-REFERENCE TO RELATED APPLICATIONS

This application is a continuation of International Application No. PCT/CN 2013/075488, filed on May 10, 2013, which is hereby incorporated by reference in its entirety.

TECHNICAL FIELD

Embodiments of the present invention relate to the field of wireless communications, and in particular, to a method for determining a precoding matrix indicator, user equipment, and a base station.

BACKGROUND

A MIMO (Multiple-Input Multiple-Output) wireless system can obtain diversity and array gains by using a transmit BF (Beam Forming) or precoding technology and a receive signal combination technology. A system that uses BF or precoding may generally be expressed as:

$$y=HVs+n, \text{where}$$

y represents a vector of a received signal, H represents a channel matrix, V represents a precoding matrix, s represents a vector of a transmitted symbol, and n represents a measurement noise. Optimal precoding generally requires that a transmitter completely know CSI (Channel State Information). A commonly used method is that user equipment quantizes instantaneous CSI and feeds back the CSI to a base station. CSI information that is fed back by an existing LTE R8 system includes an RI (Rank Indicator), a PMI (Precoding Matrix Indicator), a CQI (Channel Quality Indicator), and the like, where the RI and the PMI respectively indicate a quantity of used layers, and a precoding matrix. A set of used precoding matrices is generally referred to as a codebook (where sometimes, each precoding matrix therein is referred to as a codeword). A 4-antenna codebook of the existing LTE (Long Term Evolution) R8 is designed based on Householder transformation, and in an LTE R10 system, a design of dual codebooks is further introduced for an 8-antenna codebook. The foregoing two codebooks are mainly used for a design of an antenna of a conventional base station. A vertical antenna beam direction is controlled by the conventional base station by using a fixed downtilt or a remote and electrically adjusted downtilt, and the beam direction thereof can be dynamically adjusted by precoding or beam forming only in a horizontal direction.

To reduce system costs and meet requirements for higher system capacity and coverage, AASs (Active Antenna Systems) are widely deployed in practice, and enhancement of communication performance after an AAS system is introduced is considered in a currently launched LTE R12 standard. Compared with a traditional base station antenna, the AAS further provides a degree of freedom in a design in the vertical direction. The introduction of the degree of freedom in the vertical direction may be used for cell splitting, or may be used for implementing three-dimensional beam forming (3D-BF). The foregoing technologies propose new requirements in air interface aspects such as signaling support, codebook design, and feedback support. In such a background, on how to acquire cell splitting gains and improve system throughput performance by using codebook and feedback design, a new design scheme needs to be proposed.

SUMMARY

Embodiments of the present invention provide a method for determining a precoding matrix indicator, user equipment, and a base station, which can improve transmission performance of an active antenna system.

According to a first aspect, a method for determining a precoding matrix indicator is provided, including: receiving a first reference signal set sent by a base station; determining, based on the first reference signal set, one or more intermediate matrices, and reporting, to the base station, a first index used to indicate the intermediate matrix; receiving a second reference signal set sent by the base station; and determining, based on the second reference signal set, a precoding matrix, and reporting, to the base station, a precoding matrix indicator used to indicate the precoding matrix, where the precoding matrix is a product W of two matrices $W_1$ and $W_2$, $W=W_1W_2$, where $W_1$ is a block diagonal matrix, $W_1=\text{diag}\{X_1,X_2\}$, a block matrix $X_i$ is a kronecker product of two matrices $C_i$ and $D_i$, $X_i=C_i \otimes D_i$, i=1, 2, and the matrix $C_i$ or the matrix $D_i$ is a function of the one or more intermediate matrices.

With reference to the first aspect, in a first implementation manner of the first aspect, the first reference signal set corresponds to a subset of co-polarized antenna ports, a subset of antenna ports that are arranged in a same direction in an antenna array, or a subset of quasi co-located antenna ports.

With reference to the first aspect and the foregoing implementation manner thereof, in a second implementation manner of the first aspect, the first reference signal set is a subset of the second reference signal set.

With reference to the first aspect and the foregoing implementation manners thereof, in a third implementation manner of the first aspect, the first reference signal set is associated with a cell identity.

With reference to the first aspect and the foregoing implementation manners thereof, in a fourth implementation manner of the first aspect, the one or more intermediate matrices are matrices A whose each column is a discrete Fourier transform DFT vector, or a column vector of a Hadamard matrix or a Householder matrix, and the matrix $C_i$ or the matrix $D_i$ is a function of the one or more intermediate matrices A.

With reference to the first aspect and the foregoing implementation manners thereof, in a fifth implementation manner of the first aspect, the one or more intermediate matrices are two matrices A and B whose each column is a DFT vector, or a column vector of a Hadamard matrix, and the matrix $C_i$ or the matrix $D_i$ is a function of the intermediate matrices A and B.

With reference to the first aspect and the foregoing implementation manners thereof, in a sixth implementation manner of the first aspect, the matrix A or a subset of a set that includes the matrix A is associated with a cell identity or has a mapping relationship with a cell identity.

With reference to the first aspect and the foregoing implementation manners thereof, in a seventh implementation manner of the first aspect, the matrices A and B or subsets of a set that includes the matrices A and B are associated with cell identities or have a mapping relationship with cell identities.

According to a second aspect, a method for determining a precoding matrix indicator is provided, including: sending a first reference signal set to user equipment; receiving a first index reported by the user equipment, where the first index is used to indicate one or more intermediate matrices that are determined based on the first reference signal set by the user equipment; sending a second reference signal set to the user equipment; and receiving a precoding matrix indicator reported by the user equipment, where the precoding matrix indicator is used to indicate a precoding matrix that is determined based on the second reference signal set by the user equipment, where the precoding matrix is a product W of two matrices $W_1$ and $W_2$, and $W=W_1 W_2$, where $W_1$ is a block diagonal matrix, $W_1 = \text{diag}\{X_1, X_2\}$ a block matrix $X_i$ is a kronecker product of two matrices $C_i$ and $D_i$, $X_i = C_i \otimes D_i$, i=1, 2, and the matrix $C_i$ or the matrix $D_i$ is a function of the one or more intermediate matrices.

With reference to the second aspect, in a first implementation manner of the second aspect, the first reference signal set corresponds to a subset of co-polarized antenna ports, antenna array elements that are arranged in a same direction in an antenna array, or a subset of quasi co-located antenna ports.

With reference to the second aspect and the foregoing implementation manner thereof, in a second implementation manner of the second aspect, the first reference signal set is a subset of the second reference signal set.

With reference to the second aspect and the foregoing implementation manners thereof, in a third implementation manner of the second aspect, the first reference signal set is associated with a cell identity.

With reference to the second aspect and the foregoing implementation manners thereof, in a fourth implementation manner of the second aspect, the one or more intermediate matrices that are indicated by the first index are matrices A whose each column is a discrete Fourier transform DFT vector, or a column vector of a Hadamard matrix or a Householder matrix, and the matrix $C_i$ or the matrix $D_i$ is a function of the one or more intermediate matrices A.

With reference to the second aspect and the foregoing implementation manners thereof, in a fifth implementation manner of the second aspect, the one or more intermediate matrices that are indicated by the first index are two matrices A and B whose each column is a DFT vector, or a column vector of a Hadamard matrix, and the matrix $C_i$ or the matrix $D_i$ is a function of the intermediate matrices A and B.

With reference to the second aspect and the foregoing implementation manners thereof, in a sixth implementation manner of the second aspect, the matrix A or a subset of a set that includes the matrix A is associated with a cell identity or has a mapping relationship with a cell identity.

With reference to the second aspect and the foregoing implementation manners thereof, in a seventh implementation manner of the second aspect, the matrices A and B or subsets of a set that includes the matrices A and B are associated with cell identities or have a mapping relationship with cell identities.

According to a third aspect, user equipment is provided, including: a receiving unit, configured to receive a first reference signal set sent by a base station; and a feedback unit, configured to determine, based on the first reference signal set, one or more intermediate matrices, and report, to the base station, a first index used to indicate the determined intermediate matrix, where the receiving unit is further configured to receive a second reference signal set sent by the base station; and the feedback unit is further configured to determine, based on the second reference signal set, a precoding matrix, and report, to the base station, a precoding matrix indicator used to indicate the determined precoding matrix, where the precoding matrix is a product W of two matrices $W_1$ and $W_2$, and $W=W_1 W_2$, where $W_1$ is a block diagonal matrix, $W_1 = \text{diag}\{X_1, X_2\}$, a block matrix $X_i$ is a kronecker product of two matrices $C_i$ and $D_i$, $X_i = C_i \otimes D_i$, i=1, 2, and the matrix $C_i$ or the matrix $D_i$ a function of the one or more intermediate matrices.

With reference to the third aspect, in a first implementation manner of the third aspect, the first reference signal set corresponds to a subset of co-polarized antenna ports, a subset of antenna ports that are arranged in a same direction in an antenna array, or a subset of quasi co-located antenna ports.

With reference to the third aspect and the foregoing implementation manner thereof, in a second implementation manner of the third aspect, the first reference signal set is a subset of the second reference signal set.

With reference to the third aspect and the foregoing implementation manners thereof, in a third implementation manner of the third aspect, the first reference signal set is associated with a cell identity.

With reference to the third aspect and the foregoing implementation manners thereof, in a fourth implementation manner of the third aspect, the one or more intermediate matrices are matrices A whose each column is a discrete Fourier transform DFT vector, or a column vector of a Hadamard matrix or a Householder matrix, and the matrix $C_i$ or the matrix $D_i$ is a function of the one or more intermediate matrices A.

With reference to the third aspect and the foregoing implementation manners thereof, in a fifth implementation manner of the third aspect, the one or more intermediate matrices are two matrices A and B whose each column is a DFT vector, or a column vector of a Hadamard matrix, and the matrix $C_i$ or the matrix $D_i$ is a function of the intermediate matrices A and B.

With reference to the third aspect and the foregoing implementation manners thereof, in a sixth implementation manner of the third aspect, the matrix A or a subset of a set that includes the matrix A is associated with a cell identity or has a mapping relationship with a cell identity.

With reference to the third aspect and the foregoing implementation manners thereof, in a seventh implementation manner of the third aspect, the matrices A and B or subsets of a set that includes the matrices A and B are associated with cell identities or have a mapping relationship with cell identities.

According to a fourth aspect, a base station is provided, including: a sending unit, configured to send a first reference signal set to user equipment; and a receiving unit, configured to receive a first index reported by the user equipment, where the first index is used to indicate one or more intermediate matrices that are determined based on the first reference signal set by the user equipment, where the sending unit is further configured to send a second reference signal set to the user equipment; and the receiving unit is further configured to receive a precoding matrix indicator reported by the user equipment, where the precoding matrix indicator is used to indicate a precoding matrix that is determined based on the second reference signal set by the user equipment, where the precoding matrix is a product W of two matrices $W_1$ and $W_2$, and $W=W_1 W_2$, where $W_1$ is a block diagonal matrix, $W_1 = \text{diag}\{X_1, X_2\}$, a block matrix $X_i$ is a kronecker product of two matrices $C_i$ and $D_i$, $X_i = C_i \otimes D_i$, i=1, 2, and the matrix $C_i$ or the matrix $D_i$ is a function of the one or more intermediate matrices.

With reference to the fourth aspect, in a first implementation manner of the fourth aspect, the first reference signal set corresponds to a subset of co-polarized antenna ports, antenna array elements that are arranged in a same direction in an antenna array, or a subset of quasi co-located antenna ports.

With reference to the fourth aspect and the foregoing implementation manner thereof, in a second implementation manner of the fourth aspect, the first reference signal set is a subset of the second reference signal set.

With reference to the fourth aspect and the foregoing implementation manners thereof, in a third implementation manner of the fourth aspect, the first reference signal set is associated with a cell identity.

With reference to the fourth aspect and the foregoing implementation manners thereof, in a fourth implementation manner of the fourth aspect, the one or more intermediate matrices that are indicated by the first index are matrices A whose each column is a discrete Fourier transform DFT vector, or a column vector of a Hadamard matrix or a Householder matrix, and the matrix $C_i$ or the matrix $D_i$ is a function of the one or more intermediate matrices A.

With reference to the fourth aspect and the foregoing implementation manners thereof, in a fifth implementation manner of the fourth aspect, the one or more intermediate matrices that are indicated by the first index are two matrices A and B whose each column is a DFT vector, or a column vector of a Hadamard matrix, and the matrix $C_i$ or the matrix $D_i$ is a function of the intermediate matrices A and B.

With reference to the fourth aspect and the foregoing implementation manners thereof, in a sixth implementation manner of the fourth aspect, the matrix A or a subset of a set that includes the matrix A is associated with a cell identity or has a mapping relationship with a cell identity.

With reference to the fourth aspect and the foregoing implementation manners thereof, in a seventh implementation manner of the fourth aspect, the matrices A and B or subsets of a set that includes the matrices A and B are associated with cell identities or have a mapping relationship with cell identities.

According to a fifth aspect, user equipment is provided, including: a receiver, configured to receive a first reference signal set sent by a base station; a processor, configured to determine, based on the first reference signal set, one or more intermediate matrices; and a transmitter, configured to report a first index to the base station, where the first index is used to indicate the one or more intermediate matrices that are determined based on the first reference signal set, where the receiver is further configured to receive a second reference signal set sent by the base station; the processor is further configured to determine, based on the second reference signal set, a precoding matrix, where the precoding matrix is a product W of two matrices $W_1$ and $W_2$, and $W=W_1W_2$, where $W_1$ is a block diagonal matrix, $W_1=\text{diag}\{X_1,X_2\}$, a block matrix $X_i$ is a kronecker product of two matrices $C_i$ and $D_i$, $X_i=C_i \otimes D_i$, i=1, 2, and the matrix $C_i$ or the matrix $D_i$ is a function of the one or more intermediate matrices; and the transmitter is further configured to report a precoding matrix indicator to the base station, where the precoding matrix indicator is used to indicate the precoding matrix that is determined based on the second reference signal set.

With reference to the fifth aspect, in a first implementation manner of the fifth aspect, the first reference signal set corresponds to a subset of co-polarized antenna ports, a subset of antenna ports that are arranged in a same direction in an antenna array, or a subset of quasi co-located antenna ports.

With reference to the fifth aspect and the foregoing implementation manner thereof, in a second implementation manner of the fifth aspect, the first reference signal set is a subset of the second reference signal set.

With reference to the fifth aspect and the foregoing implementation manners thereof, in a third implementation manner of the fifth aspect, the first reference signal set is associated with a cell identity.

With reference to the fifth aspect and the foregoing implementation manners thereof, in a fourth implementation manner of the fifth aspect, the one or more intermediate matrices are matrices A whose each column is a discrete Fourier transform DFT vector, or a column vector of a Hadamard matrix or a Householder matrix, and the matrix $C_i$ or the matrix $D_i$ is a function of the one or more intermediate matrices A.

With reference to the fifth aspect and the foregoing implementation manners thereof, in a fifth implementation manner of the fifth aspect, the one or more intermediate matrices are two matrices A and B whose each column is a DFT vector, or a column vector of a Hadamard matrix, and the matrix $C_i$ or the matrix $D_i$ is a function of the intermediate matrices A and B.

With reference to the fifth aspect and the foregoing implementation manners thereof, in a sixth implementation manner of the fifth aspect, the matrix A or a subset of a set that includes the matrix A is associated with a cell identity or has a mapping relationship with a cell identity.

With reference to the fifth aspect and the foregoing implementation manners thereof, in a seventh implementation manner of the fifth aspect, the matrices A and B or subsets of a set that includes the matrices A and B are associated with cell identities or have a mapping relationship with cell identities.

According to a sixth aspect, a base station is provided, including: a transmitter, configured to send a first reference signal set to user equipment; and a receiver, configured to receive a first index reported by the user equipment, where the first index is used to indicate one or more intermediate matrices that are determined based on the first reference signal set by the user equipment, where the transmitter is further configured to send a second reference signal set to the user equipment; and the receiver is further configured to receive a precoding matrix indicator reported by the user equipment, where the precoding matrix indicator is used to indicate a precoding matrix that is determined based on the second reference signal set by the user equipment, where the precoding matrix is a product W of two matrices $W_1$ and $W_2$, and $W=W_1W_2$, where $W_1$ is a block diagonal matrix, $W_1=\text{diag}\{X_1,X_2\}$, a block matrix $X_i$ is a kronecker product of two matrices $C_i$ and $D_i$, $X_i=C_i \otimes D_i$, i=1, 2, and the matrix $C_i$ or the matrix $D_i$ is a function of the one or more intermediate matrices.

With reference to the sixth aspect, in a first implementation manner of the sixth aspect, the first reference signal set corresponds to a subset of co-polarized antenna ports, antenna array elements that are arranged in a same direction in an antenna array, or a subset of quasi co-located antenna ports.

With reference to the sixth aspect and the foregoing implementation manner thereof, in a second implementation manner of the sixth aspect, the first reference signal set is a subset of the second reference signal set.

With reference to the sixth aspect and the foregoing implementation manners thereof, in a third implementation manner of the sixth aspect, the first reference signal set is associated with a cell identity.

With reference to the sixth aspect and the foregoing implementation manners thereof, in a fourth implementation manner of the sixth aspect, the one or more intermediate matrices that are indicated by the first index are matrices A whose each column is a discrete Fourier transform DFT vector, or a column vector of a Hadamard matrix or a Householder matrix, and the matrix $C_i$ or the matrix $D_i$ is a function of the one or more intermediate matrices A.

With reference to the sixth aspect and the foregoing implementation manners thereof, in a fifth implementation manner of the sixth aspect, the one or more intermediate matrices that are indicated by the first index are two matrices A and B whose each column is a DFT vector, or a column vector of a Hadamard matrix, and the matrix $C_i$ or the matrix $D_i$ is a function of the intermediate matrices A and B.

With reference to a sixth aspect and the foregoing implementation manners thereof, in a sixth implementation manner of the sixth aspect, the matrix A or a subset of a set that includes the matrix A is associated with a cell identity or has a mapping relationship with a cell identity.

With reference to the sixth aspect and the foregoing implementation manners thereof, in a seventh implementation manner of the sixth aspect, the matrices A and B or subsets of a set that includes the matrices A and B are associated with cell identities or have a mapping relationship with cell identities.

In the embodiments of the present invention, user equipment determines an intermediate matrix according to a first reference signal set, and each column vector of the intermediate matrix separately corresponds to a beam. Due to a difference of locations, the user equipment feeds back different intermediate matrices, namely, different beams or beam groups; therefore, a base station can learn, according to an intermediate matrix fed back by the user equipment, a beam or a beam group in which the user equipment is located, so that interference between users in different beams that is caused by cell splitting that is formed due to multiple beams can be avoided by means of dynamic or semi-static scheduling of beams; and the user equipment determines a precoding matrix according to a second reference signal set, where a matrix $C_i$ or a matrix $D_i$ in a structure of the precoding matrix is a function of the one or more intermediate matrices, so that the user equipment further optimizes precoding based on the beam or beam group in which the user equipment is located. In this way, based on the precoding matrix of the intermediate matrix, gains of the foregoing cell splitting are conveniently acquired, and CSI feedback accuracy is also further improved, thereby improving transmission performance of an active antenna system.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as a Global System for Mobile Communications (GSM), a Code Division Multiple Access (CDMA) system, a Wideband Code Division Multiple Access (WCDMA), a general packet radio service (GPRS), and a Long Term Evolution (LTE).

User equipment (UE), also referred to as a mobile terminal, a mobile user equipment, and the like, may communicate with one or more core networks through a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, or the user equipment may be a relay, which exchanges language and/or data with the radio access network.

A base station may be a base station (BTS, Base Transceiver Station) in GSM or CDMA, may be a base station (NodeB) in WCDMA, or may be an evolved NodeB (eNB or e-NodeB) or a relay in LTE, which is not limited in the present invention.

In a conventional cell splitting technology, multiple independent cells are formed by forming multiple beams in a horizontal direction or a vertical direction, and an existing single cell air interface protocol is directly reused in the independent cells to perform communication. In such a method, resolution in vertical space cannot be fully developed, and therefore, better interference management cannot be provided. For example, interference between matched UEs in MU-MIMO transmission cannot be more effectively restrained, which therefore, affects further improvement of system capacity. In addition, in such a solution, each cell is split into multiple cells, which further causes a mobility problem, such as more frequent cell handovers, and further causes an interference management problem, such as a further increase in interference between cells, especially interference between the foregoing internal and external cells.

Therefore, on how to acquire cell splitting gains and improve system performance by using a codebook and feedback, a new design scheme needs to be proposed.

Figure 1:
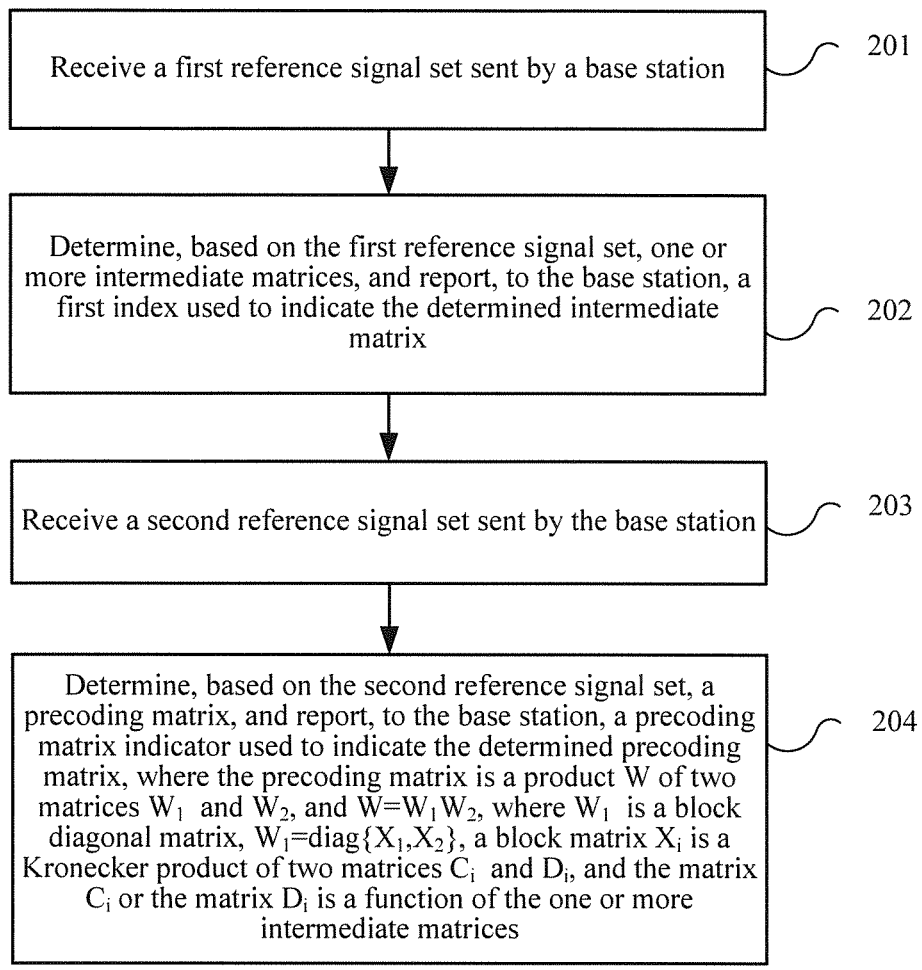
FIG. 1 is a flowchart of a method for determining a precoding matrix indicator according to an embodiment of the present invention.

FIG. 1 is a flowchart of a method for determining a precoding matrix indicator according to an embodiment of the present invention. The method of FIG. 1 is performed by user equipment (such as UE).

201. Receive a first reference signal set sent by a base station.

202. Determine, based on the first reference signal set, one or more intermediate matrices, and report, to the base station, a first index used to indicate the determined intermediate matrix.

203. Receive a second reference signal set sent by the base station.

204. Determine, based on the second reference signal set, a precoding matrix, and report, to the base station, a precoding matrix indicator used to indicate the determined precoding matrix, where the precoding matrix is a product W of two matrices $W_1$ and $W_2$, that is, $$W = W_1 W_2, \quad (1)$$

where $W_1$ is a block diagonal matrix, $$W_1 = \text{diag}\{X_1, X_2\} \quad (2)$$

and $$X_i = C_i \otimes D_i, i=1,2 \quad (3)$$

where matrix $C_i$ or matrix $D_i$ is a function of the one or more intermediate matrices, $\otimes$ indicates a Kronecker product of the two matrices, and diag{ } indicates a matrix that uses an element in "{ }" as a diagonal element, where the element herein may be a matrix, or may be a scalar, such as a real number or a complex number.

A block matrix $X_i$, which is in a form of a kronecker product, in a structure of a precoding matrix shown in formula (1) to formula (3) may implement precoding in a vertical direction and a horizontal direction by using the matrix $C_i$ and the matrix $D_i$ respectively, and therefore, a degree of freedom of an antenna of a base station in the vertical direction and the horizontal direction can be fully used. For example, the matrix $C_i$ may be used in the vertical direction, and the matrix $D_i$ may be used in the horizontal direction; or, the matrix $D_i$ may be used in the horizontal direction, and the matrix $C_i$ may be used in the vertical direction.

In this embodiment of the present invention, user equipment determines an intermediate matrix according to a first reference signal set, and each column vector of the intermediate matrix separately corresponds to a beam. Due to a difference of locations, the user equipment feeds back different intermediate matrices, namely, different beams or beam groups; therefore, a base station can learn, according to an intermediate matrix fed back by the user equipment, a beam or a beam group in which the UE is located, so that interference between users in different beams that is caused by cell splitting that is formed due to multiple beams can be avoided by means of dynamic or semi-static scheduling of beams; and the user equipment determines a precoding matrix according to a second reference signal set, where a matrix $C_i$ or a matrix $D_i$ in a structure of the precoding matrix is a function of the one or more intermediate matrices, so that the user equipment further optimizes precoding based on the beam or beam group in which the user equipment is located. In this way, based on the precoding matrix of the intermediate matrix, gains of the foregoing cell splitting are conveniently acquired, and CSI feedback accuracy is also further improved, thereby improving transmission performance of an active antenna system.

Optionally, as an embodiment, the first reference signal set corresponds to a subset of co-polarized antenna ports, a subset of antenna ports that are arranged in a same direction in an antenna port array, or a subset of quasi co-located (QCL) antenna ports. Note that the quasi co-located antenna ports mean that spacings between antennas that correspond to the antenna ports are within a range that uses a wavelength as a scale.

Optionally, as another embodiment, the second reference signal set may include one or more reference signal subsets. The reference signal subset may correspond to a subset of co-polarized antenna ports, a subset of antenna ports that are arranged in a same direction in an antenna port array, or a subset of quasi co-located antenna ports.

It should be noted that, one reference signal corresponds to one antenna port; and one antenna port may correspond to one physical antenna, or may correspond to one virtual antenna, where a virtual antenna is a weighted combination of multiple physical antennas.

Optionally, as another embodiment, the first reference signal set may be a subset of the second reference signal set.

Optionally, as another embodiment, the first reference signal set may be associated with a cell identity.

Optionally, as another embodiment, that the matrix $C_i$ or the matrix $D_i$ is a function of the one or more intermediate matrices includes that:

or the $k^{th}$ column $c_k$ of the matrix $C_i$ meets that $$c_k = \text{diag}\{\alpha_{k,1} e^{j\phi_{k,1}}, \alpha_{k,2} e^{j\phi_{k,2}}, \ldots, \alpha_{k,N_V} e^{j\phi_{k,N_V}}\} a_l, \quad (4)$$

the $k^{th}$ column $d_k$ of the matrix $D_i$ meets that $$d_k = \text{diag}\{\beta_{k,1} e^{j\varphi_{k,1}}, \beta_{k,2} e^{j\varphi_{k,2}}, \ldots, \beta_{k,N_H} e^{j\varphi_{k,N_H}}\} a_l, \quad (5)$$

where $a_l$ is the $l^{th}$ column vector of an intermediate matrix A, $N_V$ and $N_H$ are positive integers, $\phi_{k,1}, \phi_{k,2}, \ldots, \phi_{k,N_V}$ and $\varphi_{k,1}, \varphi_{k,2}, \ldots, \varphi_{k,N_H}$ are all phases, and j is a unit pure imaginary number, that is, $j^2 = -1$.

$\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1} = \alpha_{k,N_V}$, $\alpha_{k,2} = \alpha_{k,N_V-1}, \ldots, \beta_{k,1} = \alpha_{k,N_H}, \alpha_{k,2} = \alpha_{k,N_H-1}, \ldots, \alpha_{k,1}, \alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet that $$\phi_{k,p} = (p-1)\theta, p = 1, \ldots, N_V \quad (6)$$

or $$\phi_{k,p} = \begin{cases} (p-1)\theta, p = 1, \ldots, N_V/2 \\ \phi_{k,p-N_V/2} + \theta_{offset}, p = N_V/2+1, \ldots, N_V \end{cases} \quad (7)$$

where $$\theta = 2\pi/N_C \quad (8)$$

$N_C$ is a positive integer, and $\theta_{offset}$ is a phase shift, such as $$\pm \frac{\pi}{2}, \pm \frac{\pi}{4}, \pm \frac{\pi}{8},$$

or the like; or the phases $\varphi_{k,1}, \varphi_{k,2}, \ldots, \varphi_{k,N_H}$ meet that $$\varphi_{k,q} = (q-1)\vartheta, q = 1, \ldots, N_H \quad (9)$$

or

-continued $$\varphi_{k,q} = \begin{cases} (q-1)\vartheta, & q = 1, \ldots, N_H/2 \\ \phi_{k,q-N_H/2} + \vartheta_{offset}, & q = N_H/2 + 1, \ldots, N_H \end{cases} \quad (10)$$

where $$\vartheta = 2\pi/N_D \quad (11)$$

$N_D$ is a positive integer, and $\vartheta_{offset}$ is a phase shift, such as $$\pm \frac{\pi}{2}, \pm \frac{\pi}{4}, \pm \frac{\pi}{8},$$

or the like; values of the phases $\phi_{k,1}, \phi_{k,2}, \ldots, \phi_{k,N_V}$ and $\varphi_{k,1}, \varphi_{k,2}, \ldots, \varphi_{k,N_H}$ the phase shifts $\theta_{offset}$ and $\vartheta_{offset}$ are not limited to the foregoing values, and are not enumerated one by one herein.

It should be noted that for different matrices $C_i$, that the $k^{th}$ columns $c_k$ corresponding to the matrices $C_i$ meet (4) and (6) to (8) does not mean that the different matrices $C_i$ have a same $k^{th}$ column $c_k$; on the contrary, for the different matrices $C_i$, $\alpha_{k,1}, \alpha_{k,2}, \ldots, \alpha_{k,N_V}$ and $\phi_{k,1}, \phi_{k,2}, \ldots, \phi_{k,N_V}$ that correspond to the matrices $C_i$ may have different values, and a subscript l of a corresponding column vector $a_l$ may have different values. Similarly, for different matrices $D_i$, similar understandings on the $k^{th}$ columns $d_k$ that correspond to the matrices $D_i$ should be reached.

Optionally, as another embodiment, the intermediate matrix is a matrix A whose each column is a discrete Fourier transform (DFT) vector, or a column vector of a Hadamard matrix or a Householder matrix, and the matrix $C_i$ or the matrix $D_i$ is a function of the one or more intermediate matrices A.

Optionally, as another embodiment, $$a_l = \begin{bmatrix} e^{j\frac{2\pi \cdot 0 \cdot l}{N}} & e^{j\frac{2\pi \cdot 1 \cdot l}{N}} & \cdots & e^{j\frac{2\pi \cdot (M-1) \cdot l}{N}} \end{bmatrix}^T, \quad (12)$$

where $[\;]^T$ is a matrix transpose, M and N are positive integers, and $N_C \geq N$ or $N_D \geq N$; at this time, the vector $c_k$ that is shown in formula (4) and formula (6) to formula (8) or the $d_k$ that is shown in formula (5) and formula (9) to formula (11) has a space granularity finer than that of $a_l$.

Optionally, as another embodiment, that the matrix $C_i$ and the matrix $D_i$ are functions of the one or more intermediate matrices includes that:

the $k^{th}$ column $c_k$ of the matrix $C_i$ meets that $$c_k = \text{diag}\{\alpha_{k,1} e^{j\phi_{k,1}}, \alpha_{k,2} e^{j\phi_{k,2}}, \ldots, \alpha_{k,N_V} e^{j\phi_{k,N_V}}\} a_l, \quad (13)$$

and the $l^{th}$ column $d_l$ of the matrix $D_i$ meets that $$d_l = \text{diag}\{\beta_{l,1} e^{j\varphi_{l,1}}, \beta_{l,2} e^{j\varphi_{l,2}}, \ldots, \beta_{l,N_H} e^{j\varphi_{l,N_H}}\} b_n, \quad (14)$$

where $a_m$ and $b_n$ are the $m^{th}$ column vector of an intermediate matrix A and the $n^{th}$ column vector of an intermediate matrix B respectively, $N_V$ and $N_H$ are positive integers, and $\phi_{k,1}, \phi_{k,2}, \ldots, \phi_{k,N_V}$ and $\varphi_{k,1}, \varphi_{k,2}, \ldots, \varphi_{k,N_H}$ are all phases. $\alpha_{k,1}, \alpha_{k,2}, \ldots, \alpha_{k,N_V}$ and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1} = \alpha_{k,N_V}$, $\alpha_{k,2} = \alpha_{k,N_V-1}, \ldots, \beta_{k,1} = \alpha_{k,N_H}, \alpha_{k,2} = \alpha_{k,N_H-1}, \ldots, \alpha_{k,1}$, $\alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet that $$\phi_{k,p} = (p-1)\theta, \quad p = 1, \ldots, N_V \quad (15)$$

or $$\phi_{k,p} = \begin{cases} (p-1)\theta, & p = 1, \ldots, N_V/2 \\ \phi_{k,p-N_V/2} + \theta_{offset}, & p = N_V/2 + 1, \ldots, N_V \end{cases} \quad (16)$$

where $$\theta = 2\pi/N_C \quad (17),$$

$N_C$ is a positive integer, and $\theta_{offset}$ is a phase shift, such as $$\pm \frac{\pi}{2}, \pm \frac{\pi}{4}, \pm \frac{\pi}{8},$$

or the like; or the phases $\varphi_{k,1}, \varphi_{k,2}, \ldots, \varphi_{k,N_H}$ meet that $$\varphi_{l,q} = (q-1)\vartheta, \quad q = 1, \ldots, N_H \quad (18)$$

or $$\varphi_{l,q} = \begin{cases} (q-1)\vartheta, & q = 1, \ldots, N_H/2 \\ \phi_{l,q-N_H/2} + \vartheta_{offset}, & q = N_H/2 + 1, \ldots, N_H \end{cases} \quad (19)$$

where $$\vartheta = 2\pi/N_D \quad (20)$$

$N_D$ is a positive integer, and $\vartheta$ is a phase shift, such as $$\pm \frac{\pi}{2}, \pm \frac{\pi}{4}, \pm \frac{\pi}{8},$$

or the like; values of the phases $\phi_{k,1}, \phi_{k,2}, \ldots, \phi_{k,N_V}$ and $\varphi_{k,1}, \varphi_{k,2}, \ldots, \varphi_{k,N_H}$ and the phase shifts $\theta_{offset}$ and $\vartheta_{offset}$ are not limited to the foregoing values, and are not enumerated one by one herein.

It should be noted that for different matrices $C_i$, that the $k^{th}$ columns $c_k$ corresponding to the matrices $C_i$ meet (13) and (15) to (17) does not mean that the different matrices C have a same $k^{th}$ column $c_k$; on the contrary, for the different matrices $C_i$, $D_i$ and $\phi_{k,1}, \phi_{k,2}, \ldots, \phi_{k,N_V}$ that correspond to the matrices $C_i$ may have different values, and a subscript m of a corresponding column vector $a_m$ may have different values. Similarly, for different matrices $D_i$, similar understandings on the $l^{th}$ columns $d_l$ that correspond to the matrices $D_i$ should be reached.

Optionally, as another embodiment, the intermediate matrices are two matrices A and B whose each column is a DFT vector, or a column vector of a Hadamard matrix or a Householder matrix, and the matrix $C_i$ or the matrix $D_i$ is a function of the intermediate matrices A and B.

Optionally, as another embodiment, $$a_m = \begin{bmatrix} e^{j\frac{2\pi \cdot 0 \cdot m}{N}} & e^{j\frac{2\pi \cdot 1 \cdot m}{N}} & \ldots & e^{j\frac{2\pi \cdot (M-1) \cdot m}{N}} \end{bmatrix}^T; \text{ and} \quad (21)$$

$$b_n = \begin{bmatrix} e^{j\frac{2\pi \cdot 0 \cdot n}{N'}} & e^{j\frac{2\pi \cdot 1 \cdot n}{N'}} & \ldots & e^{j\frac{2\pi \cdot (M'-1) \cdot n}{N'}} \end{bmatrix}^T, \quad (22)$$

where

M, N, M', and N' are positive integers, and $N_C \geq C$ or $N_D \geq N'$; at this time, the vector $c_k$ shown in formula (13) and formula (15) to formula (17) has a space granularity finer than that of $a_l$, or the vector $d_l$ in formula (14) and formula (18) to formula (20) has a space granularity finer than that of $b_n$.

Optionally, as another embodiment, the matrix A or a subset of a set that includes the matrix A is associated with a cell identity or has a mapping relationship with a cell identity. The association or the mapping relationship is predefined or is notified by the base station to the user equipment.

Optionally, as another embodiment, the matrices A and B or subsets of a set that includes the matrices A and B are associated with cell identities or have a mapping relationship with cell identities. The association or the mapping relationship is predefined or is notified by the base station to the user equipment.

In an actual network deployment and antenna configuration, especially, for a base station antenna condition of an AAS, the user equipment in this embodiment of the present invention selects and reports, according to a codebook scheme, a precoding matrix indicator PMI, and the base station performs precoding according to information about the PMI reported by the user equipment, thereby improving performance of a system with the foregoing antenna configuration, especially with the base station antenna configuration of an AAS.

Figure 2:
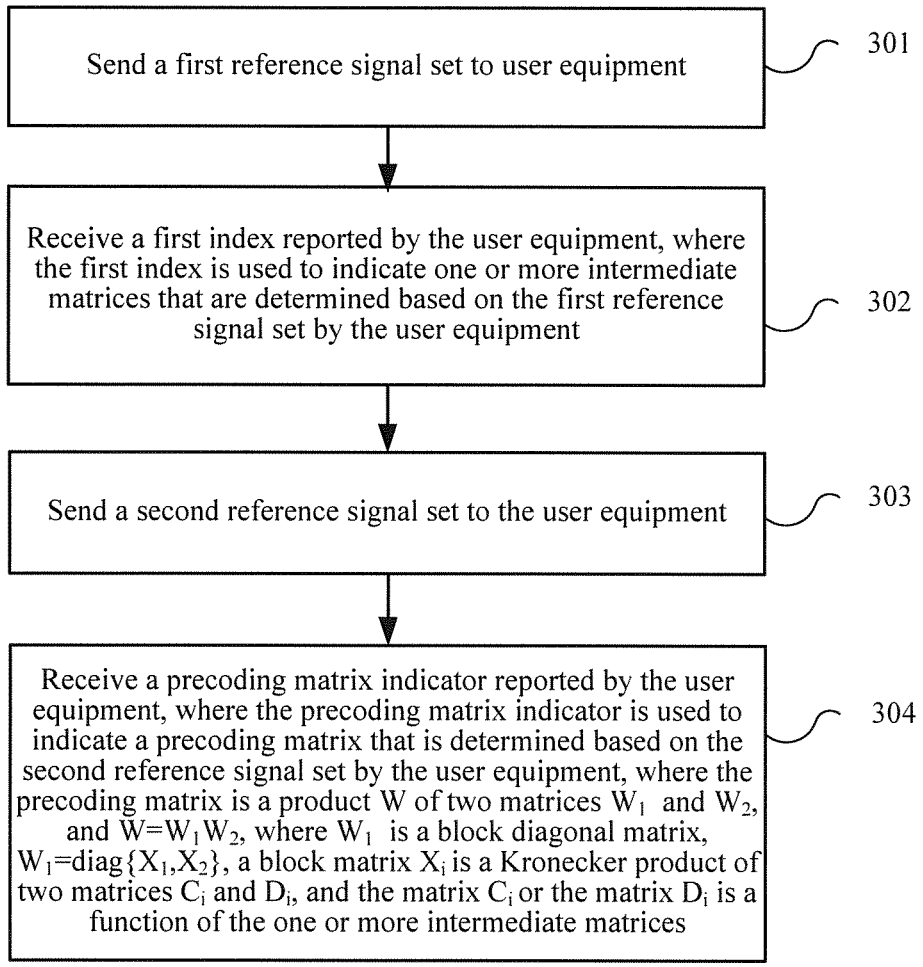
FIG. 2 is a flowchart of a method for determining a precoding matrix indicator according to another embodiment of the present invention.

FIG. 2 is a flowchart of a method for determining a precoding matrix indicator according to another embodiment of the present invention. The method of FIG. 2 is performed by a base station (such as an eNB).

301. Send a first reference signal set to user equipment.

302. Receive a first index reported by the user equipment, where the first index is used to indicate one or more intermediate matrices that are determined based on the first reference signal set by the user equipment.

303. Send a second reference signal set to the user equipment.

304. Receive a precoding matrix indicator reported by the user equipment, where the precoding matrix indicator is used to indicate a precoding matrix that is determined based on the second reference signal set by the user equipment, where the precoding matrix is a product W of two matrices $W_1$ and $W_2$, and $W = W_1 W_2$, where $W_1$ is a block diagonal matrix, $W_1 = \text{diag}\{X_1, X_2\}$, a block matrix $X_i$ is a kronecker product of two matrices $C_i$ and $D_i$, $X_i = C_i \otimes D_i$, $i = 1, 2$, and the matrix $C_i$ or the matrix $D_i$ is a function of the one or more intermediate matrices.

The base station in this embodiment of the present invention transmits two reference signal sets, and the user equipment determines a precoding matrix according to the two reference signal sets, where the precoding matrix is a product W of two matrices $W_1$ and $W_2$, the matrix $W_1$ is a block diagonal matrix, each block matrix $X_i$ in the block diagonal matrix is a kronecker product of two matrices, namely, a matrix $C_i$ and a matrix $D_i$, the matrix $C_i$ or the matrix $D_i$ is a function of the one or more intermediate matrices, and a block matrix, which is in a form of a kronecker product, in a structure of the precoding matrix may implement precoding in a vertical direction and a horizontal direction by using the matrix $C_i$ and the matrix $D_i$ respectively; therefore, transmission performance of an active antenna system can be improved by using a degree of freedom of an antenna of the base station in a horizontal direction and a vertical direction.

In addition, the UE determines an intermediate matrix according to a first reference signal set, and each column vector of the intermediate matrix separately corresponds to a beam. Due to a difference of locations, the UE feeds back different intermediate matrices, namely, different beams or beam groups; therefore, the base station can learn, according to an intermediate matrix fed back by the UE, a beam or a beam group in which the UE is located, so that interference between users in different beams that is caused by cell splitting that is formed due to multiple beams can be avoided by means of dynamic or semi-static scheduling of beams.

In addition, the matrix $C_i$ or the matrix $D_i$ is a function of the one or more intermediate matrices, so that the UE further optimizes precoding based on the beam or beam group in which the UE is located. In this way, based on the precoding matrix of the intermediate matrix, gains of the foregoing cell splitting are conveniently acquired, and CSI feedback accuracy may also be further improved, thereby improving transmission performance of an active antenna system.

Optionally, as an embodiment, the first reference signal set corresponds to a subset of co-polarized antenna ports, a subset of antenna ports that are arranged in a same direction in an antenna array, or a subset of quasi co-located antenna ports.

Optionally, as another embodiment, the second reference signal set may include one or more reference signal subsets. The reference signal subset may correspond to a subset of co-polarized antenna ports, a subset of antenna ports that are arranged in a same direction in an antenna port array, or a subset of quasi co-located antenna ports.

Optionally, as another embodiment, the first reference signal set may be a subset of the second reference signal set.

Optionally, as another embodiment, the first reference signal set may be associated with a cell identity.

Optionally, as another embodiment, that the matrix $C_i$ or the matrix $D_i$ is a function of the one or more intermediate matrices includes that:

the $k^{th}$ column $c_k$ of the matrix $C_i$ meets formula (4) or the $k^{th}$ column $d_k$ of the matrix $D_i$ meets formula (5), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1} = \alpha_{k,N_V}$, $\alpha_{k,2} = \alpha_{k,N_V-1}, \ldots, \beta_{k,1} = \alpha_{k,N_H}, \alpha_{k,2} = \alpha_{k,N_H-1}, \ldots, \alpha_{k,1}$, $\alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (6) or formula (7) and formula (8); or the phases $\varphi_{k,1}, \varphi_{k,2}, \ldots, \varphi_{k,N_H}$ meet (9) or (10) and (11). Values of phase shifts $\theta_{offset}$ and $\vartheta_{offset}$ may be $$\pm \frac{\pi}{2}, \pm \frac{\pi}{4}, \pm \frac{\pi}{8},$$

or the like; values of the phases $\phi_{k,1}, \phi_{k,2}, \ldots, \phi_{k,N_V}$ and $\varphi_{k,1}, \varphi_{k,2}, \ldots, \varphi_{k,N_H}$ and the phase shifts $\theta_{offset}$ and $\vartheta_{offset}$ are not limited to the foregoing values, and are not enumerated one by one herein.

Optionally, as another embodiment, the intermediate matrix is a matrix A whose each column is a discrete Fourier transform (DFT) vector, or a column vector of a Hadamard matrix or a Householder matrix, and the matrix $C_i$ or the matrix $D_i$ is a function of the one or more intermediate matrices A.

In this case, in step 304, that the matrix $C_i$ or the matrix $D_i$ is a function of the one or more intermediate matrices A includes that: each column of the intermediate matrix A is shown in (12), where $N_C \geq N$ or $N_D \geq N$; in this case, the vector $c_k$ that is shown in formula (4) and formula (6) to formula (8) or the $d_k$ that is shown in formula (5) and formula (9) to formula (11) has a space granularity finer than that of $a_j$.

Optionally, as another embodiment, that the matrix $C_i$ and the matrix $D_i$ are functions of the one or more intermediate matrices includes that:

the $k^{th}$ column $c_k$ of the matrix $C_i$ meets formula (13) and the $l^{th}$ column $d_l$ of the matrix $D_i$ meets formula (14), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1} = \alpha_{k,N_V}$, $\alpha_{k,2} = \alpha_{k,N_V-1}, \ldots, \beta_{k,1} = \alpha_{k,N_H}, \alpha_{k,2} = \alpha_{k,N_H-1}, \ldots, \alpha_{k,1}$, $\alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (15) or formula (16) and formula (17); or the phases $\varphi_{k,1}, \varphi_{k,2}, \ldots, \varphi_{k,N_H}$ meet (18) or (19) and (20). Values of phase shifts $\theta_{offset}$ and $\vartheta_{offset}$ may be $$\pm \frac{\pi}{2}, \pm \frac{\pi}{4}, \pm \frac{\pi}{8},$$

or the like. Values of the phases $\phi_{k,1}, \phi_{k,2}, \ldots, \phi_{k,N_V}$ and $\varphi_{k,1}, \varphi_{k,2}, \ldots, \varphi_{k,N_H}$ and the phase shifts $\theta_{offset}$ and $\vartheta_{offset}$ are not limited to the foregoing values, and are not enumerated one by one herein.

Optionally, as another embodiment, the intermediate matrices are two matrices A and B whose each column is a DFT vector, or a column vector of a Hadamard matrix, and the matrix $C_i$ or the matrix $D_i$ is a function of the intermediate matrices A and B.

In this case, in step 304, that the matrix $C_i$ or the matrix $D_i$ is a function of the intermediate matrices A and B includes that each column of the intermediate matrices A and B is shown in (21) and (22), where $N_C \geq N$ or $N_D \geq N$; in this case, the vector $c_k$ that is shown in formula (13) and formula (15) to formula (17) has a space granularity finer than that of $a_j$, or the $d_l$ that is shown in formula (14) and formula (18) to formula (20) has a space granularity finer than that of $b_n$.

Optionally, as another embodiment, the matrix A or a subset of a set that includes the matrix A is associated with a cell identity or has a mapping relationship with a cell identity. The association or the mapping relationship is predefined or is notified by the base station to the user equipment.

Optionally, as another embodiment, the matrices A and B or subsets of a set that includes the matrices A and B are associated with cell identities or have a mapping relationship with cell identities. The association or the mapping relationship is predefined or is notified by the base station to the user equipment.

The base station in this embodiment of the present invention transmits two reference signal sets, the UE determines and indicates an intermediate matrix according to a first reference signal set, and the base station can determine a suitable beam according to the information, thereby avoiding interference between users in different beams that is caused by cell splitting; the UE determines a precoding matrix according to a second reference signal set, where the precoding matrix is a product W of two matrices $W_1$ and $W_2$, the matrix $W_1$ is a block diagonal matrix, each block matrix $X_i$ in the block diagonal matrix is a kronecker product of two matrices, namely, a matrix $C_i$ and a matrix $D_i$, the matrix $C_i$ or the matrix $D_i$ is a function of the one or more intermediate matrices, and a structure of the precoding matrix can fully use a degree of freedom of an antenna of a base station of an AAS in a horizontal direction and a vertical direction; in addition, the matrix $C_i$ or the matrix $D_i$ is a function of the one or more intermediate matrices, and therefore, a precoding matrix indicator PMI is fed back based on the intermediate matrix, which can further improve CSI feedback accuracy, thereby improving transmission performance of an active antenna system.

In an actual network deployment and antenna configuration, especially, for a base station antenna condition of an AAS, the user equipment in this embodiment of the present invention selects and reports, according to a codebook scheme, a precoding matrix indicator PMI, and the base station performs precoding according to information about the PMI reported by the user equipment, thereby improving performance of a system with the foregoing antenna configuration, especially with the base station antenna configuration of an AAS.

In addition, one or more indexes are reported based on a subset to indicate a precoding matrix, which fully uses time/frequency domain/spatial correlation of a channel, thereby reducing feedback overheads.

This embodiment of the present invention is described below in more details with reference to specific examples. In an embodiment described below, an eNB is used as an example of a base station, and UE is used as an example of user equipment; however, this embodiment of the present invention is not limited thereto, and may also be applied to another communications system.

Figure 3:
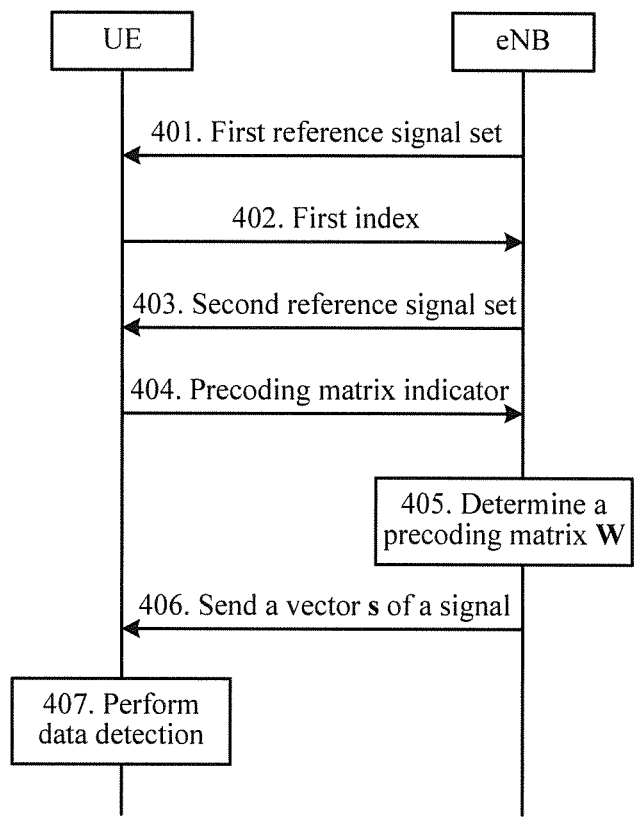
FIG. 3 is a schematic flowchart of a multi-antenna transmission method according to an embodiment of the present invention.

FIG. 3 is a schematic flowchart of a multi-antenna transmission method according to an embodiment of the present invention. The embodiment of FIG. 3 is for a scenario in which a first index indicates one intermediate matrix. In this case, a matrix $C_i$ or a matrix $D_i$ in the precoding matrix is a function of the one intermediate matrix. The matrix $C_i$ or the matrix $D_i$ may be used for precoding in a horizontal direction or in a vertical direction.

401. UE receives a first reference signal set.

Specifically, the first reference signal set received by the UE is notified by an eNB by using higher layer signaling or is dynamically notified by using a downlink control channel; or the first reference signal set received by the UE is a subset of a reference signal set that is notified by an eNB; for example, the reference signal set notified by the eNB is S, which includes 8 reference signals in total, namely, s1, s2, s3, ..., s7, and s8. Reference signals included in the reference signal set received by the UE may be 4 reference signals in S, for example, {s1, s2, s3, s4}, or {s5, s6, s7, s8}.

Further, the first reference signal set is a subset of a reference signal set that is notified by the eNB, and may correspond to a subset of co-polarized antenna ports; for example: the first reference signal set {s1, s2, s3, s4} described above corresponds to a group of co-polarized antenna ports; or the first reference signal set {s5, s6, s7, s8} described above corresponds to another group of co-polarized antenna ports.

Alternatively, the first reference signal set is a subset of a reference signal set that is notified by the eNB, and may correspond to a subset of antenna ports that correspond to a same direction in an antenna array; for example: the first reference signal set {s1, s2, s3, s4} described above corresponds to a subset of antenna ports in a same column in a vertical direction in an antenna port array; or the first reference signal set {s5, s6, s7, s8} described above corresponds to a subset of antenna ports in a same row in a horizontal direction in an antenna array.

Alternatively, the first reference signal set is a subset of a reference signal set that is notified by the eNB, and may correspond to a subset of quasi co-located antenna ports; for example: a subset of antenna ports that correspond to the first reference signal set {s1, s2, s3, s4} described above is quasi co-located, for example, spacings between the antenna ports are half a wavelength or 4 wavelengths; or a subset of antenna ports that correspond to the first reference signal set {s5, s6, s7, s8} described above is quasi co-located, for example, spacings between the antenna ports are half a wavelength or 4 wavelengths.

Implementation complexity of the foregoing reference signal subset may further be reduced.

Further, the reference signal set may be associated with a cell identity. For example, the reference signal set notified by the eNB is S, which includes 8 reference signals, namely, s1, s2, s3, . . . , s7, and s8. The foregoing reference signal is associated with a cell identity ID 0; or the reference signal set received by the UE may be divided into two or more subsets, where a subset thereof is separately associated with a specific cell identity. For example, the reference signal set received by the UE may be divided into two subsets that separately include reference signals {s1, s2, s3, s4} or {s5, s6, s7, s8}, and then {s1, s2, s3, s4} is associated with cell identities ID 1 and ID 2. The association or a mapping relationship between the foregoing reference signal set and the cell identity may be predefined, or may be notified by the eNB. The foregoing reference signal set/subset is associated with or has a mapping relationship with a cell identity, so that cell splitting or cell identification can be implemented. Note that the foregoing cell identity is not necessarily a cell ID in a specific communications protocol, such as LTE; the foregoing cell identity may also be a specific parameter, such as an index or an offset in a cell group, that is used to differentiate cell attributes.

Specifically, the foregoing reference signal may be a CRS (Cell-specific Reference Signal), a CSI-RS, or another reference signal.

402. The UE determines, based on the received first reference signal set, one or more intermediate matrices, and reports, to a base station, a first index used to indicate the intermediate matrix.

Specifically, the intermediate matrix may be a matrix A whose each column is a DFT vector, or a column vector of a Hadamard matrix, that is, $$A = [a_0 a_1 \ldots a_{N_a-1}], \quad (23)$$

where $$a_k \in \{f_0, f_1, \ldots, f_{N_f-1}\}, k=0, \ldots, N_a-1 \quad (24)$$

or $$a_k \in \{h_0, h_1, \ldots, h_{N_h-1}\}, k=0, \ldots, N_a-1 \quad (25), \text{where}$$

$N_a \geq 1$, and is a column quantity of the matrix A, and $N_h \geq 1$ and $N_f \geq 1$ are a column quantity of a Hadamard matrix and a column quantity of a DFT vector respectively; $h_m$, m=0, . . . , $N_H$−1 is a column vector of the Hadamard matrix; $f_N$, n=0, . . . , $N_f$−1 is a DFT vector, that is, $F_n$ is expressed as $$f_n = \begin{bmatrix} e^{j\frac{2\pi \cdot 0 \cdot n}{N}} & e^{j\frac{2\pi \cdot 1 \cdot n}{N}} & \ldots & e^{j\frac{2\pi \cdot (M-1) \cdot n}{N}} \end{bmatrix}^T, \quad (26)$$

where

M and N are both integers. For example:

$$[f_0 \ f_1 \ f_2 \ f_3] = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix}; \text{and} \quad (27)$$

$$[h_0 \ h_1 \ h_2 \ h_3] = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (28)$$

In addition, the matrix A may also be a matrix in another form, such as a Householder matrix, or a precoding matrix in a 4-antenna codebook in LTE R8 or an 8-antenna codebook in LTE R10. A set that includes candidate matrices A is $C_A$, where each matrix thereof may be indicated by one or more indexes.

Further, a set that includes the foregoing intermediate matrix is $C_A$, which may be further divided into multiple subsets, where each subset may be associated with or have a mapping relationship with a specific cell identity. For example, a subset $C_A^{(1)}$ in $C_A$ is associated with or mapped to a cell identity ID 1, and another subset $C_A^{(2)}$ in $C_A$ is associated with or mapped to a cell identity ID 2. The subsets $C_A^{(1)}$ and $C_A^{(2)}$ may have an intersection set, or may have no intersection set. Correspondingly, a set of first indexes that are used to indicate each matrix may also be divided into multiple subsets, where each subset may be associated with or have a mapping relationship with a specific cell identity. For example, a first index that is used to indicate a matrix in the subset $C_A^{(1)}$ is associated with or mapped to the cell identity ID 1, and a first index that is used to indicate a matrix in the subset $C_A^{(2)}$ is associated with or mapped to the cell identity ID 2. The association or the mapping relationship between a subset of the foregoing matrix or a subset of the first index and a cell identity may be predefined, or may be notified by the eNB to the UE; for example, the eNB notifies the association or the mapping relationship to the LTE by using higher layer signaling, such as RRC signaling, or a downlink control channel. Each subset described above may include only one element. In addition, the foregoing cell identity is not necessarily a cell ID in a specific communications protocol, such as LTE; the foregoing cell identity may also be a specific parameter, such as an index or an offset in a cell group, that is used to differentiate cell attributes. The association or the mapping relationship between a subset of the foregoing matrix or a subset of the first index and a cell identity can implement cell splitting or cell identification.

Specifically, based on the received first reference signal set, the UE may obtain a corresponding channel matrix through channel estimation. By using the channel matrix obtained through estimation, and based on the principle of capacity maximization or maximization of a signal to interference plus noise ratio (SINR) or received signal power maximization, an optimal matrix A may be selected, and the matrix A may be used as a precoding matrix.

It should be noted that, the first index may include one or more index values.

A first index that corresponds to the foregoing optimal matrix A may be fed back to the eNB by using higher layer signaling, or by using a physical uplink control channel (PUCCH) or a physical uplink shared channel (PUSCH).

Further, in addition to reporting the first index, a corresponding metric value, such as an SINR, a CQI, or receive power, may further be reported additionally.

403. The UE receives a second reference signal set, where the second reference signal set may include one or more reference signal subsets.

Specifically, for example, the second reference signal set received by the UE is P, which includes 8 reference signals in total, namely, p1, p2, p3, . . . , p7, and p8. The second reference signal set may include one reference signal subset, and at this time, the reference signal subset is the same as the second reference signal set; that is, the 8 reference signals p1, p2, . . . , p8 in P; or the second reference signal set may include multiple reference signal subsets; for example, the second reference signal set is P, and includes two reference signal subsets P1 and P2, where P1={p1, p2, p3, p4}, P2={p5, p6, p7, p8}.

Further, the reference signal subset included in the second reference signal set may correspond to a subset of co-polarized antenna ports; for example: the foregoing subset P1={p1, p2, p3, p4} of the second reference signal set corresponds to a group of co-polarized antenna ports; and the subset P2{p5, p6, p7, p8} of the second reference signal set corresponds to another group of co-polarized antenna ports.

Alternatively, the reference signal subset included in the second reference signal set may correspond to a subset of antenna ports that are arranged in a same direction in an antenna array; for example: the foregoing subset P1={p1, p2, p3, p4} of the second reference signal set corresponds to a subset of antenna ports in a same column in an antenna port array; and the subset P1={p5, p6, p7, p8} of the second reference signal set corresponds to a subset of antenna ports in a same row in an antenna port array.

Alternatively, the reference signal subset included in the second reference signal set may correspond to a subset of quasi co-located antenna ports; for example: a subset of antenna ports that correspond to the foregoing subset P1={p1, p2, p3, p4} of the second reference signal set is quasi co-located; for example, spacings between the antenna ports p1, p2, p3, and p4 are half a wavelength or 4 wavelengths; and a subset of antenna ports that correspond to the subset P1={p5, p6, p7, p8} of the second reference signal set is quasi co-located; for example, spacings between the antenna ports p5, p6, p7, and p8 are half a wavelength or 4 wavelengths.

Further, reference signals in the multiple reference signal subsets included in the second reference signal set may occupy different symbol/frequency/sequence resources and are transmitted in a same subframe, or occupy a same symbol/frequency/sequence resource and are transmitted in different subframes. Division of the foregoing reference signal subsets can further reduce implementation complexity.

In addition, the second reference signal set may include the first reference signal set, that is, the first reference signal set is a subset of the second reference signal set. For example, the second reference signal set P described above includes two reference signal subsets P1 and P2, and the first reference signal set may be P1, P2, a subset of P1, or a subset of P2.

Specifically, the foregoing reference signal may be a CRS, a CSI-RS, or another reference signal.

404. The UE determines, based on the second reference signal set, a precoding matrix, and reports, to the base station, a precoding matrix indicator used to indicate the precoding matrix. The precoding matrix is a product W of two matrices $W_1$ and $W_2$, and $W=W_1W_2$, where $W_1$ is a block diagonal matrix, $W_1=\text{diag}\{X_1,X_2\}$, a block matrix $X_i$ is a kronecker product of two matrices $C_i$ and $D_i$, $X_i=C_i \otimes D_i$, i=1, 2, the matrix $C_i$ or the matrix $D_i$ is a function of the one or more intermediate matrices.

Optionally, that the matrix $C_i$ or the matrix $D_i$ is a function of the one intermediate matrix includes that the $k^{th}$ column $c_k$ of the matrix i meets formula (4) or the $k^{th}$ column $d_k$ of the matrix $D_i$ meets formula (5), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1}=\alpha_{k,N_V}$, $\alpha_{k,2}=\alpha_{k,N_V-1}, \ldots, \beta_{k,1}=\alpha_{k,N_H}, \alpha_{k,2}=\alpha_{k,N_H-1}, \ldots, \alpha_{k,1}, \alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (6) or formula (7) and formula (8); or the phases $\varphi_{k,1}, \varphi_{k,2}, \ldots, \varphi_{k,N_H}$ meet (9) or (10) and (11); values of phase shifts $\theta_{offset}$ and $\vartheta_{offset}$ may be $$\pm \frac{\pi}{2}, \pm \frac{\pi}{4}, \pm \frac{\pi}{8},$$

or the like; values of the phases $\phi_{k,1}, \phi_{k,2}, \ldots, \phi_{k,N_V}$ and $\varphi_{k,1}, \varphi_{k,2}, \ldots, \varphi_{k,N_H}$ and the phase shifts $\theta_{offset}$ and $\vartheta_{offset}$ are not limited to the foregoing values, and are not enumerated one by one herein.

Further, when $a_l$ has a structure shown in (26), $a_l$ is expressed as $$a_l = \begin{bmatrix} e^{j\frac{2\pi \cdot 0 \cdot l}{N}} & e^{j\frac{2\pi \cdot 1 \cdot l}{N}} & \ldots & e^{j\frac{2\pi \cdot (M-1) \cdot l}{N}} \end{bmatrix}^T, \quad (29)$$

where

M and N are both integers; the vector $c_k$ that is shown in formula (4) and formula (6) to formula (8) or the $d_k$ that is shown in formula (5) and formula (9) to formula (11) may have a space granularity finer than that of $a_l$, that is, $$N_C \geq N \text{ or } N_D \geq N \quad (30)$$

As an embodiment of the present invention, the precoding matrix W may be the following matrix:

$$(2M)^{-\frac{1}{2}}\begin{bmatrix} 1 & e^{j\theta} & \ldots & e^{j(M-1)\theta} & e^{j\varphi} & e^{j(\varphi+\theta)} & \ldots & e^{j(\varphi+(M-1)\theta)} \end{bmatrix}^T \quad (31)$$

or $$(4M)^{-\frac{1}{2}} \begin{bmatrix} \begin{bmatrix} 1 & e^{j\theta} & \ldots & e^{j(M-1)\theta} & e^{j\phi} & e^{j(\phi+\theta)} & \ldots & e^{j(\phi+(M-1)\theta)} \end{bmatrix}^T \\ e^{j\varphi}\begin{bmatrix} 1 & e^{j\theta} & \ldots & e^{j(M-1)\theta} & e^{j\phi} & e^{j(\phi+\theta)} & \ldots & e^{j(\phi+(M-1)\theta)} \end{bmatrix}^T \end{bmatrix} \quad (32)$$

or

-continued $$(2NM)^{-\frac{1}{2}} \begin{bmatrix} \begin{bmatrix} [1 \ e^{j\theta} \ \ldots \ e^{j(M-1)\theta}]^T \\ e^{j\phi}[1 \ e^{j\theta} \ \ldots \ e^{j(M-1)\theta}]^T \\ \ldots \\ e^{j(N-1)\phi}[1 \ e^{j\theta} \ \ldots \ e^{j(M-1)\theta}]^T \end{bmatrix} \\ e^{j\varphi} \begin{bmatrix} [1 \ e^{j\theta} \ \ldots \ e^{j(M-1)\theta}]^T \\ e^{j\phi}[1 \ e^{j\theta} \ \ldots \ e^{j(M-1)\theta}]^T \\ \ldots \\ e^{j(N-1)\phi}[1 \ e^{j\theta} \ \ldots \ e^{j(M-1)\theta}]^T \end{bmatrix} \end{bmatrix}, \text{ where} \quad (33)$$

$$\varphi = 0, \pi/2, \pi, 3\pi/2 \ldots , \theta = \frac{\pi}{16}(2i_1 + \lfloor i_2/4 \rfloor),$$

$i_1=0, \ldots, 15$, $i_2=0, \ldots, 15$, a symbol "$\lfloor x \rfloor$" indicates a maximum integer that is not greater than x, $$\phi = \frac{k\pi}{32},$$

$k=0, \ldots, 15, \ldots, 32$, or the like, or $k=0, \pm 1, \ldots, \pm 15, \pm 16$, or the like; and M is a positive integer, and for example, a value of M may be 1, 2, 4, 6, 8, 16, 32, or 64; and N is a positive integer, and for example, a value of N may be 1, 2, 4, 6, 8, 16, 32, or 64.

As another embodiment of the present invention, the precoding matrix W may be the following matrix:

$$(4NM)^{-\frac{1}{2}} \begin{bmatrix} \begin{bmatrix} [1 \ e^{j\theta} \ \ldots \ e^{j(M-1)\theta}]^T & [1 \ e^{j\theta} \ \ldots \ e^{j(M-1)\theta}]^T \\ e^{j\phi}[1 \ e^{j\theta} \ \ldots \ e^{j(M-1)\theta}]^T & e^{j\phi}[1 \ e^{j\theta} \ \ldots \ e^{j(M-1)\theta}]^T \\ \ldots & \ldots \\ e^{j(N-1)\phi}[1 \ e^{j\theta} \ \ldots \ e^{j(M-1)\theta}]^T & e^{j(N-1)\phi}[1 \ e^{j\theta} \ \ldots \ e^{j(M-1)\theta}]^T \end{bmatrix} \\ \begin{bmatrix} [1 \ e^{j\theta} \ \ldots \ e^{j(M-1)\theta}]^T & -[1 \ e^{j\theta} \ \ldots \ e^{j(M-1)\theta}]^T \\ e^{j\phi}[1 \ e^{j\theta} \ \ldots \ e^{j(M-1)\theta}]^T & -e^{j\phi}[1 \ e^{j\theta} \ \ldots \ e^{j(M-1)\theta}]^T \\ \ldots & \ldots \\ e^{j(N-1)\phi}[1 \ e^{j\theta} \ \ldots \ e^{j(M-1)\theta}]^T & -e^{j(N-1)\phi}[1 \ e^{j\theta} \ \ldots \ e^{j(M-1)\theta}]^T \end{bmatrix} \end{bmatrix} \quad (34)$$

or $$(4NM)^{-\frac{1}{2}} \begin{bmatrix} \begin{bmatrix} [1 \ e^{j\theta} \ \ldots \ e^{j(M-1)\theta}]^T & [1 \ e^{j\theta} \ \ldots \ e^{j(M-1)\theta}]^T \\ e^{j\phi}[1 \ e^{j\theta} \ \ldots \ e^{j(M-1)\theta}]^T & e^{j\phi}[1 \ e^{j\theta} \ \ldots \ e^{j(M-1)\theta}]^T \\ \ldots & \ldots \\ e^{j(N-1)\phi}[1 \ e^{j\theta} \ \ldots \ e^{j(M-1)\theta}]^T & e^{j(N-1)\phi}[1 \ e^{j\theta} \ \ldots \ e^{j(M-1)\theta}]^T \end{bmatrix} \\ \begin{bmatrix} j[1 \ e^{j\theta} \ \ldots \ e^{j(M-1)\theta}]^T & -j[1 \ e^{j\theta} \ \ldots \ e^{j(M-1)\theta}]^T \\ je^{j\phi}[1 \ e^{j\theta} \ \ldots \ e^{j(M-1)\theta}]^T & -je^{j\phi}[1 \ e^{j\theta} \ \ldots \ e^{j(M-1)\theta}]^T \\ \ldots & \ldots \\ je^{j(N-1)\phi}[1 \ e^{j\theta} \ \ldots \ e^{j(M-1)\theta}]^T & -je^{j(N-1)\phi}[1 \ e^{j\theta} \ \ldots \ e^{j(M-1)\theta}]^T \end{bmatrix} \end{bmatrix}, \quad (35)$$

where $$\theta = \frac{\pi}{16}(2i_1 + \lfloor i_2/4 \rfloor),$$

$i_1=0, \ldots, 15$, $i_2=0, \ldots, 15$, a symbol "$\lfloor x \rfloor$" indicates a maximum integer that is not greater than x, $$\phi = \frac{k\pi}{32},$$

$k=0, \ldots, 15, \ldots, 32$, or the like, or $k=0, \pm 1, \ldots, \pm 15, +16$, or the like; and M is a positive integer, and for example, a value of M may be 1, 2, 4, 6, 8, 16, 32, or 64; and N is a positive integer, and for example, a value of N may be 1, 2, 4, 6, 8, 16, 32, or 64.

It may be learned by investigating the foregoing precoding matrix W that, the foregoing precoding matrix W may match an antenna configuration that is deployed in practice; because a granularity of a value of θ is π/16, spatial quantization that is more accurate is achieved, and CSI feedback accuracy can be improved; and two columns of the precoding matrix W are mutually orthogonal, which can reduce interlayer interference.

Specifically, the precoding matrix indicator reported by the UE may be one index. In this case, the index directly indicates the precoding matrix W. For example, there are 16 different precoding matrices, and then index values $n=0, \ldots$, and 15 may be used to indicate precoding matrices w whose reference signs are 0, 1, $\ldots$, and 15 respectively.

Alternatively, specifically, the precoding matrix indicator reported by the UE may be two indexes, for example, $i_1$ and $i_2$, where $W_1$ and $W_2$ that are in formula (8) are indicated by $i_1$ and $i_2$ respectively, so that $i_1$ and $i_2$ indicate the precoding matrix W.

Further, the index $i_1$ may be reported based on a subset of $W_1$. For example, a universal set of $W_1$ is Q, and subsets of the set Q are $Q_0, \ldots,$ and $Q_3$. In this case, the index $i_1$ is used to indicate a matrix $W_1$ in a subset $Q_k$. $Q_k$ may be a subset in $Q_0$, $Q_1, \ldots,$ and $Q_3$. $Q_k$ may be predefined, may be determined and reported by the UE, or may be notified by the eNB to the UE. The subsets $Q_0, \ldots,$ and $Q_3$ may not intersect each other, that is, an intersection set of the subsets is an empty set; or the subsets $Q_0, \ldots,$ and $Q_3$ may intersect each other, that is, an intersection set of the subsets is not an empty set. A design of subsets that do not intersect each other has relatively low overheads, which is more beneficial to a design of PUCCH feedback; and a design of subsets that intersect each other helps overcome an edge effect, which is more beneficial to a design of PUSCH feedback.

Alternatively, specifically, the precoding matrix indicator reported by the UE may be three indexes, for example, $i_3$, $i_4$, and $i_5$, where $X_1$ and $X_2$ that are in formula (9) are implicitly indicated by $i_3$ and $i_4$ respectively, and $W_2$ is implicitly indicated by $i_5$, so that $i_3$, $i_4$, and $i_5$ indicate the precoding matrix W.

Further, the index $i_3$ may be reported based on a subset of $X_1$. For example, a universal set of $X_1$ is R, and subsets of the set R are $R_0, \ldots,$ and $R_7$. In this case, the index $i_3$ is used to indicate a matrix $X_1$ in a subset $R_k$. $R_k$ may be a subset in $R_0$, and $R_7$. $R_k$ may be predefined, may be determined and reported by the UE, or may be notified by the eNB to the UE. The subsets $R_0, \ldots,$ and $R_7$ may not intersect each other, that is, an intersection set of the subsets is an empty set; or the subsets $R_0, \ldots,$ and $R_7$ may intersect each other, that is, an intersection set of the subsets is not an empty set. Similarly, $i_4$ and $i_5$ may be reported based on a subset of $X_2$ and $W_2$ respectively. The subset of $X_2$ and $W_2$ may be predefined, may be determined and reported by the UE, or may be notified by the eNB to the UE.

Alternatively, specifically, the precoding matrix indicator reported by the UE may be three other indexes, for example, $i_6$, $i_7$, and $i_8$, where $C_i$ and $D_i$ that are in formula (11) are implicitly indicated by $i_6$ and $i_7$ respectively, and $W_2$ is implicitly indicated by $i_8$, so that $i_6$, $i_7$, and $i_8$ indicate the precoding matrix W, and at this time, $C_1=C_2$ and $D_1=D_2$.

Further, the index $i_6$ may be reported based on a subset of $C_i$. For example, a universal set of $C_i$ is O, and subsets of the set O are $O_0, \ldots,$ and $O_7$. In this case, the index $i_6$ is used to indicate a matrix $C_i$ in a subset $O_k$. $O_k$ may be a subset in $O_0$, $O_1, \ldots,$ and $O_7$. $O_k$ may be predefined, may be determined and reported by the UE, or may be notified by the eNB to the UE. The subsets $O_0, \ldots,$ and $O_7$ may not intersect each other, that is, an intersection set of the subsets is an empty set; or the subsets $O_0, \ldots,$ and $O_7$ may intersect each other, that is, an intersection set of the subsets is not an empty set. Similarly, $i_7$ and $i_8$ may be reported based on a subset of $D_i$ and $W_2$ respectively. The subset of $D_i$ and $W_2$ may be predefined, may be determined and reported by the UE, or may be notified by the eNB to the UE.

Specifically, the precoding matrix indicator reported by the UE may also be four indexes, for example, $i_9$, $i_{10}$, $i_{11}$, and $i_{12}$, where $C_1$ and $C_2$ that are in formula (11) are implicitly indicated by $i_9$ and $i_{10}$ respectively, and $D_1=D_2$ and $W_2$ are indicated by $i_{11}$ and $i_{12}$ respectively, so that $i_9$, $i_{10}$, $i_{11}$, and $i_{12}$ indicate the precoding matrix W.

Further, the indexes $i_9$, $i_{10}$, $i_{11}$, and $i_{12}$ may be reported based on a subset of $C_1$, $C_2$, $D_i$, and $W_2$ respectively, where the subset of $C_1$, $C_2$, $D_i$, and $W_2$ may be predefined, may be determined and reported by the UE, or may be notified by the eNB to the UE.

Specifically, when the UE reports, based on the second reference signal set, a precoding matrix indicator, the precoding matrix indicator may be calculated based on one reference signal subset; for example, the index value n described above is calculated based on the reference signal subset P in step 403, or the index values $i_1$ and $i_2$, or $i_3$, $i_4$, and $i_5$, or $i_6$, $i_7$, and $i_8$, or $i_9$, $i_{10}$, $i_{11}$, and $i_{12}$ are calculated based on the reference signal subset P in step 403;

the precoding matrix indicator may be calculated jointly based on multiple reference signal subsets; for example, the index value n described above is calculated based on the reference signal subsets P1 and P2 in step 403, or the index values $i_1$ and $i_2$, or $i_3$, $i_4$, and $i_5$, or $i_6$, $i_7$, and $i_8$, or $i_9$, $i_{10}$, $i_{11}$, and $i_{12}$ are calculated based on the reference signal subsets P1 and P2 in step 403; or the precoding matrix indicator is calculated separately based on multiple reference signal subsets; for example, the index value $i_3$ described above is calculated based on the reference signal subset P1 in step 403, and the index values $i_4$ and $i_5$ are calculated based on the reference signal subset P2 in step 403; or the index value $i_6$ described above is calculated based on the reference signal subset P1 in step 403, and the index values $i_7$ and $i_8$ are calculated based on the reference signal subset P2 in step 403; or the index values $i_9$ and $i_{10}$ are calculated based on the reference signal subset P1 in step 403, and the index values $i_{11}$ and $i_{12}$ are calculated based on the reference signal subset P2 in step 403.

Specifically, the UE may determine the one or more indexes according to a measured channel state and based on a preset rule, where the preset rule may be a rule of throughput maximization or a rule of capacity maximization. After obtaining the foregoing precoding matrix indicator, the UE may feed back the precoding matrix indicator to the eNB by using a PUCCH or a PUSCH.

Further, the UE may report, in different subframes, the foregoing precoding matrix indicator to the eNB by using a PUCCH.

Still further, multiple different indexes in the foregoing precoding matrix indicator may be reported, for different subbands in a frequency domain, in different subframes to the eNB by using a PUCCH.

405. The eNB obtains, based on the acquired precoding matrix indicator, a precoding matrix W, where the precoding matrix has a structure shown in formula (1) to formula (3), formula (4) to formula (12), or formula (23) to formula (35).

406. The eNB transmits a vector S of a signal by using the precoding matrix W. Specifically, a vector, which is transmitted after precoding, of a signal is Ws.

407. The UE receives a signal sent by the eNB and performs data detection. Specifically, the signal received by the UE is:

$$y=HWs+n \qquad (36),$$ where y is a vector of the received signal, H is a channel matrix obtained through estimation, and n is measured noise and interference.

A block matrix $X_i$, which is in a form of a kronecker product, in a codebook structure of the precoding matrix may implement precoding in a vertical direction and a horizontal direction by using matrix $C_i$ and $D_i$ matrix respectively; therefore, a degree of freedom of an active antenna system in the vertical direction can be fully used, thereby improving feedback accuracy, and improving performance of MIMO, especially, that of MU-MIMO.

Figure 4:
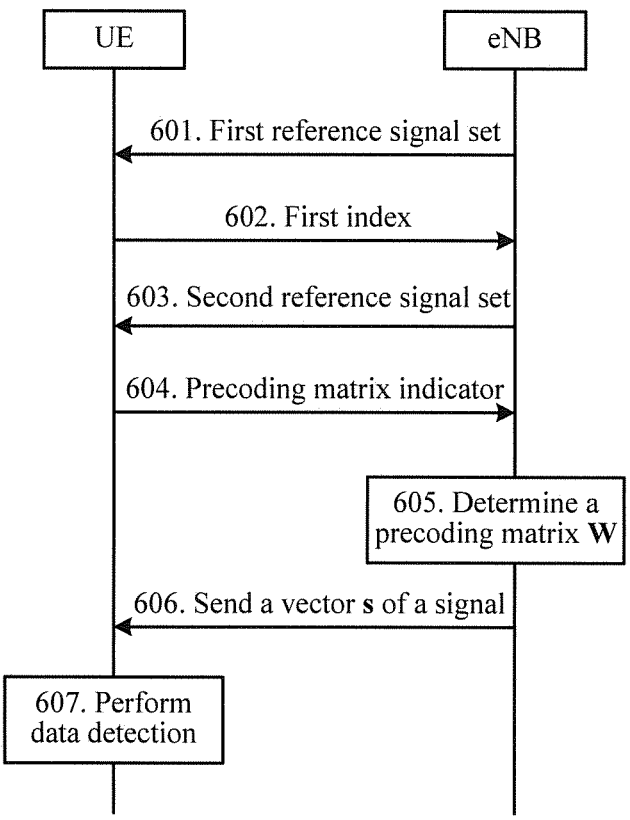
FIG. 4 is a schematic flowchart of a multi-antenna transmission method of an embodiment according to another embodiment of the present invention.

FIG. 4 is a schematic flowchart of a multi-antenna transmission method of an embodiment according to another embodiment of the present invention. The embodiment of FIG. 4 is for a scenario in which a first index indicates multiple intermediate matrices. In this case, matrix $C_i$ or matrix $D_i$ in the precoding matrix is a function of the multiple intermediate matrices. The matrix $C_i$ or the matrix $D_i$ may be used for precoding in a horizontal direction or in a vertical direction.

601. UE receives a first reference signal set.

A specific description is the same as that of step 401 in FIG. 3, and therefore, is not provided herein again.

602. The UE determines, based on the received first reference signal set, multiple intermediate matrices, and reports, to a base station, a first index used to indicate the intermediate matrices.

Specifically, the matrix may be two matrices A and B; for example, each column of A and B is a DFT vector, or a column vector of a Hadamard matrix, that is, $$A=[a_0 a_1 \ldots a_{N_a-1}], \quad (37)$$

where $$a_k \in \{f_0, f_1, \ldots, f_{N_f-1}\}, k=0, \ldots, N_a-1 \quad (38)$$

or $$a_k \in \{h_0, h_1, \ldots, h_{N_h-1}\}, k=0, \ldots, N_a-1 \quad (39),$$

$$B=[b_0 b_1 \ldots b_{N_b-1}], \quad (40)$$

where $$b_k \in \{f'_0, f'_1, \ldots, f'_{N'_f-1}\}, k=0, \ldots, N_b-1 \quad (41)$$

or $$b_k \in \{h'_0, h'_1, \ldots, h'_{N'_h-1}\}, k=0, \ldots, N_b-1 \quad (42), \text{ where}$$

$N_a \geq 1$ and $N_b \geq 1$ are column quantities of the matrices A and B respectively, $N_h, N'_h \geq 1$ and $N_f, N'_f \geq 1$ are column quantities of different Hadamard matrices and a column quantity of a DFT vector respectively; $h_m, h'_m$ is a column vector of a Hadamard matrix; $f_n, f'_n$ a DFT vector, that is, $f_n, f'_n$ indicates that $$f_n = \left[ e^{j\frac{2\pi \cdot 0 \cdot n}{N}} \quad e^{j\frac{2\pi \cdot 1 \cdot n}{N}} \quad \ldots \quad e^{j\frac{2\pi \cdot (M-1) \cdot n}{N}} \right]^T; \text{ and} \quad (43)$$

$$f'_n = \left[ e^{j\frac{2\pi \cdot 0 \cdot n}{N'}} \quad e^{j\frac{2\pi \cdot 1 \cdot n}{N'}} \quad \ldots \quad e^{j\frac{2\pi \cdot (M'-1) \cdot n}{N'}} \right]^T, \quad (44)$$

where

M, M', N, N' are all integers.

In addition, the matrix A may also be a matrix in another form, such as a precoding matrix in a 4-antenna codebook in LTE R8 or an 8-antenna codebook in LTE R10. A set that includes candidate matrices A is $C_A$, where each matrix thereof may be indicated by one or more indexes.

As an embodiment of the present invention, the precoding matrix W may be the following matrix:

$$(2M)^{-\frac{1}{2}}[1 \quad e^{j\theta} \quad \ldots \quad e^{j(M-1)\theta} \quad e^{j\varphi} \quad e^{j(\varphi+\theta)} \quad \ldots \quad e^{j(\varphi+(M-1)\theta)}]^T \quad (45)$$

or $$(4M)^{-\frac{1}{2}} \begin{bmatrix} [1 \quad e^{j\theta} \quad \ldots \quad e^{j(M-1)\theta} \quad e^{j\phi} \quad e^{j(\phi+\theta)} \quad \ldots \quad e^{j(\phi+(M-1)\theta)}]^T \\ e^{j\varphi}[1 \quad e^{j\theta} \quad \ldots \quad e^{j(M-1)\theta} \quad e^{j\phi} \quad e^{j(\phi+\theta)} \quad \ldots \quad e^{j(\phi+(M-1)\theta)}]^T \end{bmatrix} \quad (46)$$

or $$(2NM)^{-\frac{1}{2}} \begin{bmatrix} \begin{bmatrix} [1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T \\ \ldots \\ e^{j(N-1)\phi}[1 \quad e^{j\theta} \quad \ldots \quad e^{j(M-1)\theta}]^T \end{bmatrix} \\ e^{j\varphi} \begin{bmatrix} [1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T \\ \ldots \\ e^{j(N-1)\phi}[1 \quad e^{j\theta} \quad \ldots \quad e^{j(M-1)\theta}] \end{bmatrix} \end{bmatrix}, \text{ where} \quad (47)$$

$$\varphi = 0, \pi/2, \pi, 3\pi/2 \ldots, \theta = \frac{\pi}{16}(2i_1 + \lfloor i_2/4 \rfloor),$$

$i_1=0, \ldots, 15, i_2=0, \ldots, 15$, a symbol "$\lfloor x \rfloor$" indicates a maximum integer that is not greater than x, $$\phi = \frac{k\pi}{32},$$

$k=0, \ldots, 15, \ldots, 32$, or the like, or $k=0, \pm 1, \ldots, \pm 15, \pm 16$, or the like; and M is a positive integer, and for example, a value of M may be 1, 2, 4, 6, 8, 16, 32, or 64; and N is a positive integer, and for example, a value of N may be 1, 2, 4, 6, 8, 16, 32, or 64.

As another embodiment of the present invention, the precoding matrix W may be the following matrix:

$$(4NM)^{-\frac{1}{2}} \begin{bmatrix} \begin{bmatrix} [1 \quad e^{j\theta} \quad \ldots \quad e^{j(M-1)\theta}]^T & [1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T & e^{j\phi}[1 \quad e^{j\theta} \quad \ldots \quad e^{j(M-1)\theta}]^T \\ \ldots & \ldots \\ e^{j(N-1)\phi}[1 \quad e^{j\theta} \quad \ldots \quad e^{j(M-1)\theta}]^T & e^{j(N-1)\phi}[1 \quad e^{j\theta} \quad \ldots \quad e^{j(M-1)\theta}]^T \end{bmatrix} \\ \begin{bmatrix} [1 \quad e^{j\theta} \quad \ldots \quad e^{j(M-1)\theta}]^T & -[1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T & -e^{j\phi}[1 \quad e^{j\theta} \quad \ldots \quad e^{j(M-1)\theta}]^T \\ \ldots & \ldots \\ e^{j(N-1)\phi}[1 \quad e^{j\theta} \quad \ldots \quad e^{j(M-1)\theta}]^T & -e^{j(N-1)\phi}[1 \quad e^{j\theta} \quad \ldots \quad e^{j(M-1)\theta}]^T \end{bmatrix} \end{bmatrix} \quad (48)$$

or

-continued $$(4NM)^{-\frac{1}{2}}\begin{bmatrix}\begin{bmatrix}[1\ e^{j\theta}\ \ldots\ e^{j(M-1)\theta}]^T & [1\ e^{j\theta}\ \ldots\ e^{j(M-1)\theta}]^T\\ e^{j\phi}[1\ e^{j\theta}\ \ldots\ e^{j(M-1)\theta}]^T & e^{j\phi}[1\ e^{j\theta}\ \ldots\ e^{j(M-1)\theta}]^T\\ \ldots & \ldots\\ e^{j(N-1)\phi}[1\ e^{j\theta}\ \ldots\ e^{j(M-1)\theta}]^T & e^{j(N-1)\phi}[1\ e^{j\theta}\ \ldots\ e^{j(M-1)\theta}]^T\end{bmatrix}\\ \begin{bmatrix}j[1\ e^{j\theta}\ \ldots\ e^{j(M-1)\theta}]^T & -j[1\ e^{j\theta}\ \ldots\ e^{j(M-1)\theta}]^T\\ je^{j\phi}[1\ e^{j\theta}\ \ldots\ e^{j(M-1)\theta}]^T & -je^{j\phi}[1\ e^{j\theta}\ \ldots\ e^{j(M-1)\theta}]^T\\ \ldots & \ldots\\ je^{j(N-1)\phi}[1\ e^{j\theta}\ \ldots\ e^{j(M-1)\theta}]^T & -je^{j(N-1)\phi}[1\ e^{j\theta}\ \ldots\ e^{j(M-1)\theta}]^T\end{bmatrix}\end{bmatrix}, \text{where} \quad (49)$$

$$\theta = \frac{\pi}{16}(2i_1 + \lfloor i_2/4 \rfloor),$$

$i_1=0, \ldots, 15$, $i_2=0, \ldots, 15$, a symbol "$\lfloor x \rfloor$" indicates a maximum integer that is not greater than x, $$\phi = \frac{k\pi}{32},$$

$k=0, \ldots, 13, \ldots, 32$, or the like, or $k=0, \pm 1, \ldots, \pm 15, \pm 16$, or the like; and M is a positive integer, and for example, a value of M may be 1, 2, 4, 6, 8, 16, 32, or 64; and N is a positive integer, and for example, a value of N may be 1, 2, 4, 6, 8, 16, 32, or 64.

It may be learned by investigating the foregoing precoding matrix W that, the foregoing precoding matrix W may match an antenna configuration that is deployed in practice; because a granularity of a value of θ is π/16, spatial quantization that is more accurate is achieved, and CSI feedback accuracy can be improved; and two columns of the precoding matrix w are mutually orthogonal, which can reduce interlayer interference.

Further, a set that includes the foregoing candidate matrix is $C_A$ or $C_B$, which may be further divided into multiple subsets, where each subset may be associated with or have a mapping relationship with a specific cell identity. For example, a subset $C_A^{(1)}$ in $C_A$ is associated with or mapped to a cell identity $ID_1$, and another subset $C_A^{(2)}$ in $C_A$ is associated with or mapped to a cell identity $ID_2$. The subsets $C_A^{(1)}$ and $C_A^{(2)}$ may have an intersection set, or may have no intersection set. Correspondingly, a set of first indexes that are used to indicate each matrix may also be divided into multiple subsets, where each subset may be associated with or have a mapping relationship with a specific cell identity. For example, a first index that is used to indicate a matrix in the subset $C_B^{(1)}$ in $C_B$ is associated with or mapped to the cell identity $ID_1$, and a first index that is used to indicate a matrix in the subset $C_B^{(2)}$ in $C_B$ is associated with or mapped to the cell identity $ID_2$. The association or the mapping relationship between a subset of the foregoing matrix or a subset of one or more indexes and a cell identity may be predefined, or may be notified by the eNB to the UE; for example, the eNB notifies the association or the mapping relationship to the UE by using higher layer signaling, such as RRC signaling, or a downlink control channel. Each subset described above may include only one element. In addition, the foregoing cell identity is not necessarily a cell ID in a specific communications protocol, such as LTE; the foregoing cell identity may also be a specific parameter, such as an index or an offset in a cell group, that is used to differentiate cell attributes. The association or the mapping relationship between a subset of the foregoing matrix or a subset of the one or more indexes and a cell identity can implement cell splitting or cell identification.

Specifically, based on the received first reference signal set, the UE may obtain a corresponding channel matrix through channel estimation. By using the channel matrix obtained through estimation, and based on the principle of capacity maximization or maximization of an SINR or received signal power maximization, an optimal matrix A or B may be selected, and the matrix A or B may be used as a precoding matrix.

It should be noted that, the first index may include one or more index values.

One or more indexes that correspond to the foregoing optimal matrix A or B may be fed back to the eNB by using higher layer signaling, or by using a PUCCH or a PUSCH.

Further, in addition to reporting the one or more indexes, a corresponding metric value, such as an SINR, a CQI, or receive power, may further be reported additionally.

603. The LIE receives a second reference signal set, where the second reference signal set may include one or more reference signal subsets.

A specific description is the same as that of step 403 in FIG. 3, and is therefore not provided herein again.

604. The UE determines, based on the second reference signal set, a precoding matrix, and reports, to the base station, a precoding matrix indicator that indicates the precoding matrix. The precoding matrix is a product W of two matrices $W_1$ and $W_2$, and $W=W_1W_2$, where $W_1$ is a block diagonal matrix, $W_1=\text{diag}\{X_1,X_2\}$, a block matrix $X_i$ is a kronecker product of two matrices $C_i$ and $D_i$, $X_i=C_i \otimes D_i$, i=1, 2, and the matrix $C_i$ or the matrix $D_i$ is a function of the intermediate matrices.

Optionally, that the matrix $C_i$ or the matrix $D_i$ is a function of the multiple intermediate matrices includes that the $k^{th}$ column $c_k$ of the matrix $C_i$ meets formula (13) and the $l^{th}$ column $d_l$ of the matrix $D_i$ meets formula (14), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1}=\alpha_{k,N_V}$, $\alpha_{k,2}=\alpha_{k,N_V-1}, \ldots, \beta_{k,1}=\alpha_{k,N_H}, \alpha_{k,2}=\alpha_{k,N_H-1}, \ldots, \alpha_{k,1}, \alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (15) or formula (16) and formula (17); or the phases $\varphi_{k,1}, \varphi_{k,2}, \ldots, \varphi_{k,N_H}$ meet (18) or (19) and (20). Values of phase shifts $\theta_{\text{offset}}$ and $\vartheta_{\text{offset}}$ may be $$\pm\frac{\pi}{2}, \pm\frac{\pi}{4}, \pm\frac{\pi}{8},$$

or the like. Values of the phases $\phi_{k,1}, \phi_{k,2}, \ldots, \phi_{k,N_V}$ and $\varphi_{k,1}, \varphi_{k,2}, \ldots, \varphi_{k,N_H}$ and the phase shifts $\theta_{offset}$ and $\vartheta_{offset}$ are not limited to the foregoing values, and are not enumerated one by one herein.

Further, when $a_m$ is in a form shown in (43), $a_m$ may be expressed as $$a_m = \left[ e^{j\frac{2\pi \cdot 0 \cdot m}{N}} \quad e^{j\frac{2\pi \cdot 1 \cdot m}{N}} \quad \ldots \quad e^{j\frac{2\pi \cdot (M-1) \cdot m}{N}} \right]^T, \quad (50)$$

where

M, N are both integers; the vector $c_k$ in formula (13) and formula (15) to formula (17) may have a space granularity finer than that of $a_l$, that is, $$N_C \geq N \quad (51).$$

Similarly, when $b_n$ is in a form shown in (44), $b_l$ is expressed as $$b_n = \left[ e^{j\frac{2\pi \cdot 0 \cdot n}{N'}} \quad e^{j\frac{2\pi \cdot 1 \cdot n}{N'}} \quad \ldots \quad e^{j\frac{2\pi \cdot (M'-1) \cdot n}{N'}} \right]^T, \quad (52)$$

where

M', N' are both integers; the vector $d_l$ in formula (14) and formula (18) to formula (20) may have a space granularity finer than that of $b_n$, that is, $$N_D \geq N' \quad (53)$$

Specifically, there may be one index that is used to indicate a precoding matrix and reported by the UE, and at this time, the index directly indicates a precoding matrix W. For example, there are 16 different precoding matrices in total, and then index values n=0, . . . , and 15 may be used to indicate precoding matrices W whose reference signs are 0, 1, . . . , and 15 respectively.

Alternatively, specifically, the precoding matrix indicator reported by the UE may be two indexes, for example, $i_1$ and $i_2$, where $W_1$ and $W_2$ that are in formula (8) are indicated by $i_1$ and $i_2$ respectively, so that $i_1$ and $i_2$ indicate the precoding matrix W.

Further, the index may be reported based on a subset of $W_1$. For example, a universal set of $W_1$ is Q, and subsets of the set Q are $Q_0, \ldots,$ and $Q_3$. In this case, the index $i_1$ is used to indicate a matrix $W_1$ in a subset $Q_k$. $Q_k$ may be a subset in $Q_0, Q_1, \ldots,$ and $Q_3$. $Q_k$ may be predefined, may be determined and reported by the UE, or may be notified by the eNB to the UE. The subsets $Q_0, \ldots,$ and $Q_3$ may not intersect each other, that is, an intersection set of the subsets is an empty set; or the subsets $Q_0, \ldots,$ and $Q_3$ may intersect each other, that is, an intersection set of the subsets is not an empty set.

Alternatively, specifically, the precoding matrix indicator reported by the UE may be three indexes, for example, $i_3$, $i_4$, and $i_5$, where $X_1$ and $X_2$ that are in formula (9) are implicitly indicated by $i_3$ and $i_4$ respectively, and $W_2$ is implicitly indicated by $i_5$, so that $i_3$, $i_4$, and $i_5$ indicate the precoding matrix W.

Further, the index $i_3$ may be reported based on a subset of $X_1$. For example, a universal set of $X_1$ is R, and subsets of R are $R_0, \ldots,$ and $R_7$. In this case, the index $i_3$ is used to indicate a matrix $X_1$ in a subset $R_k$. $R_k$ may be a subset in $R_0, R_1 \ldots,$ and $R_7$. $R_k$ may be predefined, may be determined and reported by the UE, or may be notified by the eNB to the UE. The subsets $R_0, \ldots,$ and $R_7$ may not intersect each other, that is, an intersection set of the subsets is an empty set; or the subsets $R_0, \ldots,$ and $R_7$ may intersect each other, that is, an intersection set of the subsets is not an empty set. Similarly, $i_4$ and $i_5$ may be reported based on a subset of $X_2$ and $W_2$ respectively. The subset of $X_2$ and $W_2$ may be predefined, may be determined and reported by the UE, or may be notified by the eNB to the UE.

Alternatively, specifically, the precoding matrix indicator reported by the UE may be three other indexes, for example $i_6$, $i_7$, and $i_8$, where $C_i$ and $D_i$ that are in formula (11) are implicitly indicated by $i_6$ and $i_7$ respectively, and $W_2$ is implicitly indicated by $i_8$, so that $i_6$, $i_7$, and $i_8$ indicate the precoding matrix W, and at this time, $C_1=C_2$ and $D_1=D_2$.

Further, the index $i_6$ may be reported based on a subset of $C_i$. For example, a universal set of $C_i$ is O, and subsets of the set O are $O_0, \ldots,$ and $O_7$. In this case, the index $i_6$ is used to indicate a matrix $C_i$, in a subset $O_k$. $O_k$ may be a subset in $O_0, O_1 \ldots,$ and $O_7$. $O_k$ may be predefined, may be determined and reported by the UE, or may be notified by the eNB to the UE. The subsets $O_0, \ldots,$ and $O_7$ may not intersect each other, that is, an intersection set of the subsets is an empty set; or the subsets $O_0, \ldots,$ and $O_7$ may intersect each other, that is, an intersection set of the subsets is not an empty set. Similarly, $i_7$ and $i_8$ may be reported based on a subset of $D_i$ and $W_2$ respectively. The subset of $D_i$, and $W_2$ may be predefined, may be determined and reported by the UE, or may be notified by the eNB to the UE.

Specifically, there may be four indexes that are used to indicate the precoding matrix and are reported by the UE, for example, $i_9$, $i_{10}$, $i_{11}$, and $i_{12}$, where $C_1$ and $C_2$ that are in formula (11) are implicitly indicated by $i_9$ and $i_{10}$ respectively, and $D_1=D_2$ and $W_2$ are indicated by $i_{11}$ and $i_{12}$ respectively, so that $i_9$, $i_{10}$, $i_{11}$, and $i_{12}$ indicate the precoding matrix W.

Further, the indexes $i_9$, $i_{10}$, $i_{11}$, and $i_{12}$ may be reported based on a subset of $C_1$, $C_2$, $D_i$, and $W_2$ respectively, where the subset of $C_1$, $C_2$, $D_i$, and $W_2$ may be predefined, may be determined and reported by the UE, or may be notified by the eNB to the UE.

Specifically, when the UE reports, based on the second reference signal set, a precoding matrix indicator, the precoding matrix indicator may be calculated based on a reference signal subset; for example, the index value n described above is calculated based on the reference signal subset P in step 603, or the index values $i_1$ and $i_2$, or $i_3$, $i_4$, and $i_5$, or $i_6$, $i_7$, and $i_8$, or $i_9$, $i_{10}$, $i_{11}$, and $i_{12}$ are calculated based on the reference signal subset P in step 603; or the precoding matrix indicator may be calculated jointly based on multiple reference signal subsets; for example, the index value n described above is calculated based on the reference signal subsets P1 and P2 in step 603, or the index values $i_1$ and $i_2$, or $i_3$, $i_4$, and $i_5$, or $i_6$, $i_7$, and $i_8$, or $i_9$, $i_{10}$, $i_{11}$, and $i_{12}$ are calculated based on the reference signal subsets P1 and P2 in step 603; or the precoding matrix indicator is calculated separately based on multiple reference signal subsets; for example, the index value $i_3$ described above is calculated based on the reference signal subset P1 in step 603, and the index values $i_4$ and $i_5$ are calculated based on the reference signal subset P2 in step 603; or the index value $i_6$ described above is calculated based on the reference signal subset P1 in step 603, and the index values $i_7$ and $i_8$ are calculated based on the reference signal subset P2 in step 603; or the index values $i_9$ and $i_{10}$ are calculated based on the reference signal subset P1 in step 603, and the index values $i_{11}$ and $i_{12}$ are calculated based on the reference signal subset P2 in step 603.

Specifically, the UE may determine the one or more indexes according to a measured channel state and based on a preset rule, where the preset rule may be a rule of throughput maximization or a rule of capacity maximization. After obtaining the foregoing precoding matrix indicator, the UE may feed back the precoding matrix indicator to the eNB by using a PUCCH or a PUSCH.

Further, the LIE may report, in different subframes, the foregoing precoding matrix indicator to the eNB by using a PUCCH.

Still further, multiple different indexes in the foregoing precoding matrix indicator may be reported, for different subbands in a frequency domain, in different subframes to the eNB by using a PUCCH.

605. An eNB obtains, based on the acquired precoding matrix indicator, a precoding matrix W, where the precoding matrix may have a structure shown in formula (1) to formula (3), formula (13) to formula (22), or formula (37) to formula (53).

606. The eNB transmits a vector S of a signal by using the precoding matrix W. Specifically, a vector, which is transmitted after precoding, of a signal is Ws.

607. The UE receives a signal sent by the eNB and performs data detection. Specifically, the signal received by the UE is:

$y = HWs + n$, where y is a vector of the received signal, H is a channel matrix obtained through estimation, and n is measured noise and interference.

A block matrix $X_i$, which is in a form of a kronecker product, in a structure of the precoding matrix may implement precoding in a vertical direction and a horizontal direction by using a matrix $C_i$ and a matrix $D_i$ respectively; therefore, a degree of freedom of an active antenna system in the horizontal direction and the vertical direction can be fully used, thereby improving feedback accuracy, and improving performance of MIMO, especially, that of MU-MIMO.

Figure 5:
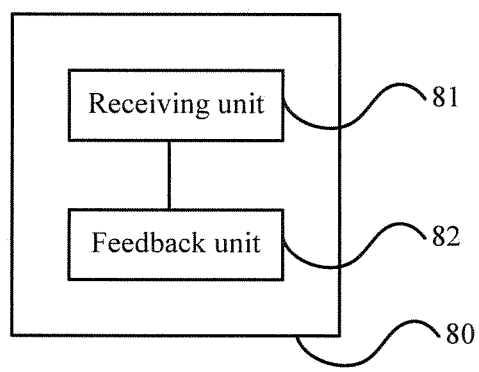
FIG. 5 is a block diagram of user equipment according to an embodiment of the present invention.

FIG. 5 is a block diagram of user equipment according to an embodiment of the present invention. User equipment 80 of FIG. 5 includes a receiving unit 81 and a feedback unit 82.

The receiving unit 81 is configured to receive a first reference signal set sent by a base station.

The feedback unit 82 is configured to determine, based on the first reference signal set, one or more intermediate matrices, and report, to the base station, a first index used to indicate the determined intermediate matrix.

The receiving unit 81 is further configured to receive a second reference signal set sent by the base station.

The feedback unit 82 is further configured to determine, based on the second reference signal set, a precoding matrix, and report, to the base station, a precoding matrix indicator used to indicate the determined precoding matrix. The precoding matrix is a product W of two matrices $W_1$ and $W_2$, and $W = W_1 W_2$, where $W_1$ is a block diagonal matrix, $W_1 = \text{diag}\{X_1, X_2\}$, a block matrix $X_i$ is a kronecker product of two matrices $C_i$ and $D_i$, and $X_i = C_i \otimes D_i$, i=1, 2, and the matrix $C_i$ or the matrix $D_i$ is a function of the intermediate matrices.

In this embodiment of the present invention, user equipment determines an intermediate matrix according to a first reference signal set, and each column vector of the intermediate matrix separately corresponds to a beam. Due to a difference of locations, the user equipment feeds back different intermediate matrices, namely, different beams or beam groups; therefore, a base station can learn, according to an intermediate matrix fed back by the user equipment, a beam or a beam group in which the user equipment is located, so that interference between users in different beams that is caused by cell splitting that is formed due to multiple beams can be avoided by means of dynamic or semi-static scheduling of beams; and the user equipment determines a precoding matrix according to a second reference signal set, where a matrix $C_i$ or a matrix $D_i$ in a structure of the precoding matrix is a function of the one or more intermediate matrices, so that the user equipment further optimizes precoding based on the beam or beam group in which the user equipment is located. In this way, based on the precoding matrix of the intermediate matrix, gains of the foregoing cell splitting are conveniently acquired, and CSI feedback accuracy is also further improved, thereby improving transmission performance of an active antenna system.

Optionally, as an embodiment, the first reference signal set corresponds to a subset of co-polarized antenna ports, a subset of antenna ports that are arranged in a same direction in an antenna port array, or a subset of quasi co-located antenna ports.

Optionally, as another embodiment, the second reference signal set includes one or more reference signal subsets, where the reference signal subset corresponds to a subset of co-polarized antenna ports, a subset of antenna ports that are arranged in a same direction in an antenna port array, or a subset of quasi co-located antenna ports.

Optionally, as another embodiment, the first reference signal set is a subset of the second reference signal set.

Optionally, as another embodiment, the first reference signal set is associated with a cell identity.

Optionally, as another embodiment, that the matrix $C_i$ or the matrix $D_i$ is a function of the one or more intermediate matrices includes that:

the $k^{th}$ column $c_k$ of the matrix $C_i$ meets formula (4) or the $k^{th}$ column $d_k$ of the matrix $D_i$ meets formula (5), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1} = \alpha_{k,N_V}$, $\alpha_{k,2} = \alpha_{k,N_V-1}$, $\ldots$, $\beta_{k,1} = \alpha_{k,N_H}$, $\alpha_{k,2} = \alpha_{k,N_H-1}$, $\ldots$, $\alpha_{k,1}$, $\alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (6) or formula (7) and formula (8); or the phases $\varphi_{k,1}, \varphi_{k,2}, \ldots, \varphi_{k,N_H}$ meet (9) or (10) and (11); values of phase shifts $\theta_{offset}$ and $\vartheta_{offset}$ may be $$\pm \frac{\pi}{2}, \pm \frac{\pi}{4}, \pm \frac{\pi}{8},$$

or the like; values of the phases $\phi_{k,1}, \phi_{k,2}, \ldots, \phi_{k,N_V}$ and $\varphi_{k,1}, \varphi_{k,2}, \ldots, \varphi_{k,N_H}$ and the phase shifts $\theta_{offset}$ and $\vartheta_{offset}$ are not limited to the foregoing values, and are not enumerated one by one herein.

Optionally, as another embodiment, the intermediate matrix is a matrix A whose each column is a discrete Fourier transform DFT vector, or a column vector of a Hadamard matrix or a Householder matrix, and the matrix $C_i$ or the matrix $D_i$ is a function of the one or more intermediate matrices A.

Optionally, as another embodiment, that the matrix $C_i$ and the matrix $D_i$ are functions of the one or more intermediate matrices includes that:

the $k^{th}$ column $c_k$ of the matrix $C_i$ meets formula (13) and the $l^{th}$ column $d_l$ of the matrix $D_i$ meets formula (14), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1}=\alpha_{k,N_V}$, $\alpha_{k,2}=\alpha_{k,N_V-1}, \ldots, \beta_{k,1}=\alpha_{k,N_H}, \alpha_{k,2}=\alpha_{k,N_H-1}, \ldots, \alpha_{k,1}$, $\alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (15) or formula (16) and formula (17); or the phases $\varphi_{k,1}$, $\varphi_{k,2}, \ldots, \varphi_{k,N_H}$ meet (18) or (19) and (20). Values of phase shifts $\theta_{\text{offset}}$ and $\vartheta_{\text{offset}}$ may be $$\pm \frac{\pi}{2}, \pm \frac{\pi}{4}, \pm \frac{\pi}{8},$$

or the like. Values of the phases $\phi_{k,1}, \phi_{k,2}, \ldots, \phi_{k,N_V}$ and $\varphi_{k,1}$, $\varphi_{k,2}, \ldots, \varphi_{k,N_{VH}}$ and the phase shifts $\theta_{\text{offset}}$ and $\vartheta_{\text{offset}}$ are not limited to the foregoing values, and are not enumerated one by one herein.

Optionally, as another embodiment, the intermediate matrices are two matrices A and B whose each column is a DFT vector, or a column vector of a Hadamard matrix, and the matrix $C_i$ or the matrix $D_i$ is a function of the intermediate matrices A and B.

Optionally, as another embodiment, the precoding matrix may be a matrix shown in (31) to (35).

Optionally, as another embodiment, the matrix A or a subset of a set that includes the matrix A is associated with a cell identity or has a mapping relationship with a cell identity. The association or the mapping relationship is predefined or is notified by the base station to the user equipment.

Optionally, as another embodiment, the matrices A and B or subsets of a set that includes the matrices A and B are associated with cell identities or have a mapping relationship with cell identities. The association or the mapping relationship is predefined or is notified by the base station to the user equipment.

The base station in this embodiment of the present invention transmits two reference signal sets, the UE determines and indicates an intermediate matrix according to a first reference signal set, and the base station can determine a suitable beam according to the information, thereby avoiding interference between users in different beams that is caused by cell splitting; the LIE determines a precoding matrix according to a second reference signal set, where the precoding matrix is a product W of two matrices $W_1$ and $W_2$, the matrix $W_1$ is a block diagonal matrix, each block matrix $X_i$ in the block diagonal matrix is a kronecker product of two matrices, namely, a matrix $C_i$ and a matrix $D_i$, the matrix $C_i$ or the matrix $D_i$ is a function of the one or more intermediate matrices, and a structure of the precoding matrix can fully use a degree of freedom of an antenna of a base station of an AAS in a horizontal direction and a vertical direction; in addition, the matrix $D_i$ or the matrix $W_1$ is a function of the one or more intermediate matrices, and therefore, a precoding matrix indicator PMI is fed back based on the intermediate matrix, which can further improve CSI feedback accuracy, thereby improving transmission performance of an active antenna system.

In an actual network deployment and antenna configuration, especially, for a base station antenna condition of an AAS, the user equipment in this embodiment of the present invention selects and reports, according to a codebook scheme, a precoding matrix indicator PMI, and the base station performs precoding according to information about the PMI reported by the user equipment, thereby improving performance of a system with the foregoing antenna configuration, especially with the base station antenna configuration of an AAS.

In addition, one or more indexes are fed back based on a subset to indicate a precoding matrix, which fully uses time/frequency domain/spatial correlation of a channel, thereby reducing feedback overheads.

Figure 6:
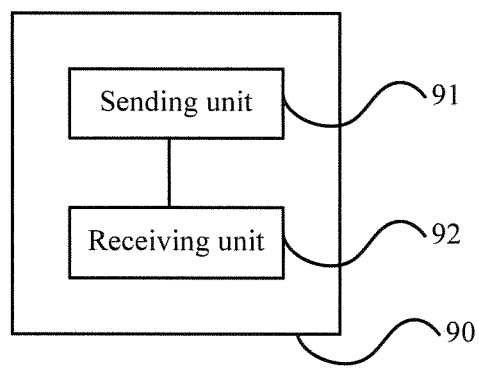
FIG. 6 is a block diagram of a base station according to an embodiment of the present invention.

FIG. 6 is a block diagram of a base station according to an embodiment of the present invention. A base station 90 of FIG. 6 includes a sending unit 91 and a receiving unit 92.

The sending unit 91 is configured to send a first reference signal set to user equipment.

The receiving unit 92 is configured to receive a first index that is determined and reported based on the first reference signal set by the user equipment, where the first index is used to indicate one or more intermediate matrices.

The sending unit 91 is further configured to send a second reference signal set to the user equipment.

The receiving unit 92 is further configured to receive a precoding matrix indicator that is reported based on the second reference signal set by the user equipment, where the precoding matrix indicator is used to indicate a precoding matrix, where the precoding matrix is a product W of two matrices $W_1$ and $W_2$, and $W=W_1 W_2$, where $W_1$ is a block diagonal matrix, $W_1=\text{diag}\{X_1, X_2\}$, a block matrix $X_i$ is a kronecker product of two matrices $C_i$ and $D_i$, $X_i = C_i \otimes D_i$, $i=1, 2$, and the matrix $C_i$ or the matrix $D_i$ is a function of the one or more intermediate matrices.

In this embodiment of the present invention, user equipment determines an intermediate matrix according to a first reference signal set, and each column vector of the intermediate matrix separately corresponds to a beam. Due to a difference of locations, the user equipment feeds back different intermediate matrices, namely, different beams or beam groups; therefore, a base station can learn, according to an intermediate matrix fed back by the user equipment, a beam or a beam group in which the user equipment is located, so that interference between users in different beams that is caused by cell splitting that is formed due to multiple beams can be avoided by means of dynamic or semi-static scheduling of beams; and the user equipment determines a precoding matrix according to a second reference signal set, where a matrix $C_i$ or a matrix $D_i$ in a structure of the precoding matrix is a function of the one or more intermediate matrices, so that the user equipment further optimizes precoding based on the beam or beam group in which the user equipment is located. In this way, based on the precoding matrix of the intermediate matrix, gains of the foregoing cell splitting are conveniently acquired, and CSI feedback accuracy is also further improved, thereby improving transmission performance of an active antenna system.

Optionally, as an embodiment, the first reference signal set corresponds to a subset of co-polarized antenna ports, a subset of antenna ports that are arranged in a same direction in an antenna port array, or a subset of quasi co-located antenna ports.

Optionally, as another embodiment, the second reference signal set includes one or more reference signal subsets, where the reference signal subset corresponds to a subset of co-polarized antenna ports, a subset of antenna ports that are arranged in a same direction in an antenna port array, or a subset of quasi co-located antenna ports.

Optionally, as another embodiment, the first reference signal set is a subset of the second reference signal set.

Optionally, as another embodiment, the first reference signal set is associated with a cell identity.

Optionally, as another embodiment, that the matrix $C_i$ or the matrix $D_i$ is a function of the one or more intermediate matrices includes that:

the $k^{th}$ column $c_k$ of the matrix $C_i$ meets formula (4) or the $k^{th}$ column $d_k$ of the matrix $D_i$ meets formula (5), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1}=\alpha_{k,N_V}$, $\alpha_{k,2}=\alpha_{k,N_V-1}, \ldots, \beta_{k,1}=\alpha_{k,N_H}, \alpha_{k,2}=\alpha_{k,N_H-1}, \ldots, \alpha_{k,1}$, $\alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (6) or formula (7) and formula (8); or the phases $\varphi_{k,1}, \varphi_{k,2}, \ldots, \varphi_{k,N_H}$ meet (9) or (10) and (11); values of phase shifts $\theta_{offset}$ and $\vartheta_{offset}$ may be $$\pm \frac{\pi}{2}, \pm \frac{\pi}{4}, \pm \frac{\pi}{8},$$

or the like; values of the phases $\phi_{k,1}, \phi_{k,2}, \ldots, \phi_{k,N_V}$ and $\varphi_{k,1}, \varphi_{k,2}, \ldots, \varphi_{k,N_V}$ and the phase shifts $\theta_{offset}$ and $\vartheta_{offset}$ are not limited to the foregoing values, and are not enumerated one by one herein.

Optionally, as another embodiment, the one or more intermediate matrices that are indicated by the first index are matrices A whose each column is a discrete Fourier transform DFT vector, or a column vector of a Hadamard matrix or a Householder matrix, and the matrix $C_i$ or the matrix $D_i$ is a function of the one or more intermediate matrices A. For example, the matrix A is shown in formula (23) to formula (30).

Optionally, as another embodiment, that the matrix $C_i$ and the matrix $D_i$ are functions of the one or more intermediate matrices includes that:

the $k^{th}$ column $c_k$ of the matrix $C_i$ meets formula (13) and the $l^{th}$ column $d_l$ of the matrix $D_i$ meets formula (14), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1}=\alpha_{k,N_V}$, $\alpha_{k,2}=\alpha_{k,N_V-1}, \ldots, \beta_{k,1}=\alpha_{k,N_H}, \alpha_{k,2}=\alpha_{k,N_H-1}, \ldots, \alpha_{k,1}$, $\alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (15) or formula (16) and formula (17); or the phases $\varphi_{k,1}, \varphi_{k,2}, \ldots, \varphi_{k,N_H}$ meet (18) or (19) and (20). Values of phase shifts $\theta_{offset}$ and $\vartheta_{offset}$ may be $$\pm \frac{\pi}{2}, \pm \frac{\pi}{4}, \pm \frac{\pi}{8},$$

or the like. Values of the phases $\phi_{k,1}, \phi_{k,2}, \ldots, \phi_{k,N_V}$ and $\varphi_{k,1}, \varphi_{k,2}, \ldots, \varphi_{k,N_H}$ and the phase shifts $\theta_{offset}$ and $\vartheta_{offset}$ are not limited to the foregoing values, and are not enumerated one by one herein.

Optionally, as another embodiment, the one or more intermediate matrices that are indicated by the first index are two matrices A and B whose each column is a DFT vector, or a column vector of a Hadamard matrix, and the matrix $C_i$ or the matrix $D_i$ is a function of the intermediate matrices A and B. For example, the matrices A and B are shown in formula (32) to formula (43).

Optionally, as another embodiment, the precoding matrix may be a matrix shown in (45) to (49).

Optionally, as another embodiment, the matrix A or a subset of a set that includes the matrix A is associated with a cell identity or has a mapping relationship with a cell identity. The association or the mapping relationship is predefined or is notified by the base station to the user equipment.

Optionally, as another embodiment, the matrices A and B or subsets of a set that includes the matrices A and B are associated with cell identities or have a mapping relationship with cell identities. The association or the mapping relationship is predefined or is notified by the base station to the user equipment.

The base station in this embodiment of the present invention transmits two reference signal sets, the UE determines and indicates an intermediate matrix according to a first reference signal set, and the base station can determine a suitable beam according to the information, thereby avoiding interference between users in different beams that is caused by cell splitting; the LTE determines a precoding matrix according to a second reference signal set, where the precoding matrix is a product W of two matrices $W_1$ and $W_2$ the matrix $W_1$ is a block diagonal matrix, each block matrix $X_i$ in the block diagonal matrix is a kronecker product of two matrices, namely, a matrix $C_i$ and a matrix $D_i$, the matrix $C_i$ or the matrix $D_i$ is a function of the one or more intermediate matrices, and a structure of the precoding matrix can fully use a degree of freedom of an antenna of a base station of an AAS in a horizontal direction and a vertical direction; in addition, the matrix $C_i$ or the matrix $D_i$ is a function of the one or more intermediate matrices, and therefore, a precoding matrix indicator PMI is fed back based on the intermediate matrix, which can further improve CSI feedback accuracy, thereby improving transmission performance of an active antenna system.

In an actual network deployment and antenna configuration, especially, for a base station antenna condition of an AAS, the user equipment in this embodiment of the present invention selects and reports, according to a codebook scheme, a precoding matrix indicator PMI, and the base station performs precoding according to information about the PMI reported by the user equipment, thereby improving performance of a system with the foregoing antenna configuration, especially with the base station antenna configuration of an AAS.

In addition, one or more indexes are reported based on a subset to indicate a precoding matrix, which fully uses time/frequency domain/spatial correlation of a channel, thereby reducing feedback overheads.

Figure 7:
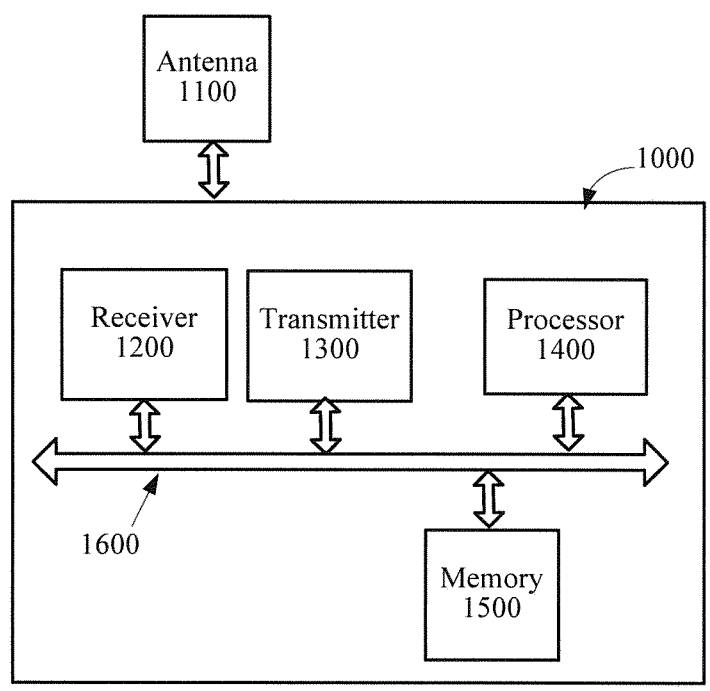
FIG. 7 is a block diagram of user equipment according to another embodiment of the present invention.

FIG. 7 is a block diagram of user equipment according to another embodiment of the present invention. User equipment 1000 of FIG. 7 includes a receiver 1200, a transmitter 1300, a processor 1400, and a memory 1500.

The receiver 1200 is configured to receive a first reference signal set sent by a base station.

The memory 1500 stores an instruction that makes the processor 1400 perform the following operations: determining and feeding back, based on the first reference signal set, a first index, where the first index is used to indicate one or more intermediate matrices.

The transmitter 1300 is configured to report the first index to the base station.

The receiver 1200 is further configured to receive a second reference signal set sent by the base station.

The memory 1500 further stores an instruction that enables the processor 1400 to perform the following operation: determining, based on the second reference signal set, a precoding matrix indicator, where the precoding matrix indicator is used to indicate a precoding matrix, where the precoding matrix is a product W of two matrices $W_1$ and $W_2$, and $W=W_1W_2$, where $W_1$ is a block diagonal matrix, $W_1=\text{diag}\{X_1,X_2\}$, a block matrix $X_i$ is a kronecker product of two matrices $C_i$ and $D_i$, $X_i = C_i \otimes D_i$, i=1, 2, and the matrix $C_i$ or the matrix $D_i$ is a function of the one or more intermediate matrices.

The transmitter 1300 is further configured to feed back the precoding matrix indicator to the base station.

In this embodiment of the present invention, user equipment determines an intermediate matrix according to a first reference signal set, and each column vector of the intermediate matrix separately corresponds to a beam. Due to a difference of locations, the user equipment feeds back different intermediate matrices, namely, different beams or beam groups; therefore, a base station can learn, according to an intermediate matrix fed back by the user equipment, a beam or a beam group in which the user equipment is located, so that interference between users in different beams that is caused by cell splitting that is formed due to multiple beams can be avoided by means of dynamic or semi-static scheduling of beams; and the user equipment determines a precoding matrix according to a second reference signal set, where a matrix $C_i$ or a matrix $D_i$ in a structure of the precoding matrix is a function of the one or more intermediate matrices, so that the user equipment further optimizes precoding based on the beam or beam group in which the user equipment is located. In this way, based on the precoding matrix of the intermediate matrix, gains of the foregoing cell splitting are conveniently acquired, and CSI feedback accuracy is also further improved, thereby improving transmission performance of an active antenna system.

The receiver 1200, the transmitter 1300, the processor 1400, and the memory 1500 may be integrated into a processing chip. Alternatively, as shown in FIG. 7, the receiver 1200, the transmitter 1300, the processor 1400, and the memory 1500 are connected by using a bus system 1600.

In addition, the user equipment 1000 may further include an antenna 1100. The processor 1400 may further control an operation of the user equipment 1000, and the processor 1400 may further be referred to as a CPU (Central Processing Unit). The memory 1500 may include a read-only memory and a random access memory, and provide instructions and data to the processor 1400. A part of the memory 1500 may further include a non-volatile random access memory. Components of the user equipment 1000 are coupled together by using the bus system 1600, where the bus system 1600 not only includes a data bus, but also may further include a power bus, a control bus, a status signal bus, and the like. However, for clear description, various buses in the figure are all marked as the bus system 1600.

Optionally, as an embodiment, the first reference signal set corresponds to a subset of co-polarized antenna ports, a subset of antenna ports that are arranged in a same direction in an antenna array, or a subset of quasi co-located antenna ports.

Optionally, as another embodiment, the second reference signal set includes one or more reference signal subsets, where the reference signal subset corresponds to a subset of co-polarized antenna ports, a subset of antenna ports that are arranged in a same direction in an antenna port array, or a subset of quasi co-located antenna ports.

Optionally, as another embodiment, the first reference signal set is a subset of the second reference signal set.

Optionally, as another embodiment, the first reference signal set is associated with a cell identity.

Optionally, as another embodiment, that the matrix $C_i$ or the matrix $D_i$ is a function of the one or more intermediate matrices includes that:

the $k^{th}$ column $c_k$ of the matrix $C_i$ meets formula (4) or the $k^{th}$ column $d_k$ of the matrix $D_i$ meets formula (5), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1}=\alpha_{k,N_V}$, $\alpha_{k,2}=\alpha_{k,N_V-1}, \ldots, \beta_{k,1}=\alpha_{k,N_H}, \alpha_{k,2}=\alpha_{k,N_H-1}, \ldots, \alpha_{k,1}, \alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (6) or formula (7) and formula (8); or the phases $\varphi_{k,1}, \varphi_{k,2}, \ldots, \varphi_{k,N_H}$ meet (9) or (10) and (11); values of phase shifts and $\theta_{offset}$ and $\vartheta_{offset}$ may be $$\pm \frac{\pi}{2}, \pm \frac{\pi}{4}, \pm \frac{\pi}{8},$$

or the like; values of the phases $\phi_{k,1}, \phi_{k,2}, \ldots, \phi_{k,N_V}$ and $\varphi_{k,1}, \varphi_{k,2}, \ldots, \varphi_{k,N_H}$ and the phase shifts $\theta_{offset}$ and $\vartheta_{offset}$ are not limited to the foregoing values, and are not enumerated one by one herein.

Optionally, as another embodiment, the one or more intermediate matrices are matrices A whose each column is a discrete Fourier transform DFT vector, or a column vector of a Hadamard matrix or a Householder matrix, and the matrix $C_i$ or the matrix $D_i$ is a function of the one or more intermediate matrices A. For example, the matrix A is shown in formula (23) to formula (30).

Optionally, as another embodiment, that the matrix $C_i$ and the matrix $D_i$ are functions of the one or more intermediate matrices includes that:

the $k^{th}$ column $c_k$ of the matrix $C_i$ meets formula (13) and the $l^{th}$ column $d_l$ of the matrix $D_i$ meets formula (14), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1}=\alpha_{k,N_V}$, $\alpha_{k,2}=\alpha_{k,N_V-1}, \ldots, \beta_{k,1}=\alpha_{k,N_H}, \alpha_{k,2}=\alpha_{k,N_H-1}, \ldots, \alpha_{k,1}, \alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (15) or formula (16) and formula (17); or the phases $\varphi_{k,1}, \varphi_{k,2}, \ldots, \varphi_{k,N_H}$ meet (18) or (19) and (20). Values of phase shifts $\theta_{offset}$ and $\vartheta_{offset}$ may be $$\pm \frac{\pi}{2}, \pm \frac{\pi}{4}, \pm \frac{\pi}{8},$$

or the like. Values of the phases $\phi_{k,1}, \phi_{k,2}, \ldots, \phi_{k,N_V}$ and $\varphi_{k,1}, \varphi_{k,2}, \ldots, \varphi_{k,N_H}$ and the phase shifts $\theta_{offset}$ and $\vartheta_{offset}$ are not limited to the foregoing values, and are not enumerated one by one herein.

Optionally, as another embodiment, the one or more intermediate matrices are two matrices A and B whose each column is a DFT vector, or a column vector of a Hadamard matrix, and the matrix $C_i$ or the matrix $D_i$ is a function of the intermediate matrices A and B. For example, the matrices A and B are shown in formula (37) to formula (44) and formula (50) to formula (53).

Optionally, as another embodiment, the matrix A or a subset of a set that includes the matrix A is associated with a cell identity or has a mapping relationship with a cell identity. The association or the mapping relationship is predefined or is notified by the base station to the user equipment.

Optionally, as another embodiment, the matrices A and B or subsets of a set that includes the matrices A and B are associated with cell identities or have a mapping relationship with cell identities. The association or the mapping relationship is predefined or is notified by the base station to the user equipment.

In this embodiment of the present invention, user equipment determines an intermediate matrix according to a first reference signal set, and each column vector of the intermediate matrix separately corresponds to a beam. Due to a difference of locations, the user equipment feeds back different intermediate matrices, namely, different beams or beam groups; therefore, a base station can learn, according to an intermediate matrix fed back by the user equipment, a beam or a beam group in which the user equipment is located, so that interference between users in different beams that is caused by cell splitting that is formed due to multiple beams can be avoided by means of dynamic or semi-static scheduling of beams; and the user equipment determines a precoding matrix according to a second reference signal set, where a matrix $C_i$ or a matrix $D_i$ in a structure of the precoding matrix is a function of the one or more intermediate matrices, so that the user equipment further optimizes precoding based on the beam or beam group in which the user equipment is located. In this way, based on the precoding matrix of the intermediate matrix, gains of the foregoing cell splitting are conveniently acquired, and CSI feedback accuracy is also further improved, thereby improving transmission performance of an active antenna system.

In an actual network deployment and antenna configuration, especially, for a base station antenna condition of an AAS, the user equipment in this embodiment of the present invention selects and reports, according to a codebook scheme, a precoding matrix indicator PMI, and the base station performs precoding according to information about the PMI reported by the user equipment, thereby improving performance of a system with the foregoing antenna configuration, especially with the base station antenna configuration of an AAS.

In addition, one or more indexes are fed back based on a subset to indicate a precoding matrix, which fully uses time/frequency domain/spatial correlation of a channel, thereby reducing feedback overheads.

Figure 8:
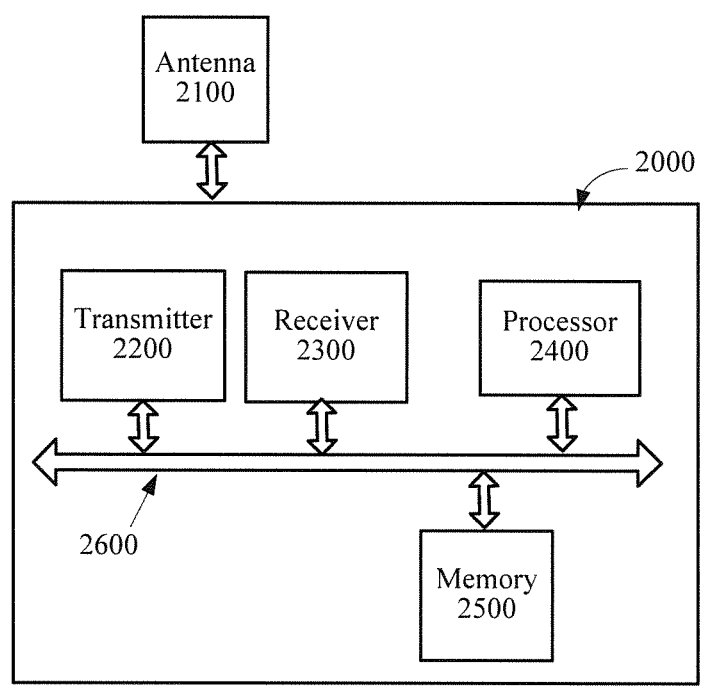
FIG. 8 is a block diagram of a base station according to another embodiment of the present invention.

FIG. 8 is a block diagram of a base station according to another embodiment of the present invention. A base station 2000 of FIG. 8 includes a transmitter 2200 and a receiver 2300.

The transmitter 2200 is configured to send a first reference signal set to user equipment.

The receiver 2300 is configured to receive a first index that is determined and reported based on the first reference signal set by the user equipment, where the first index is used to indicate one or more intermediate matrices.

The transmitter 2200 is further configured to send a second reference signal set to the user equipment.

The receiver 2300 is further configured to receive a precoding matrix indicator that is reported based on the second reference signal set by the user equipment, where the precoding matrix indicator is used to indicate a precoding matrix, where the precoding matrix is a product W of two matrices $W_1$ and $W_2$, and $W=W_1W_2$, where $W_1$ is a block diagonal matrix, $W_1=\text{diag}\{X_1,X_2\}$, a block matrix $X_i$ is a kronecker product of two matrices $C_i$ and $D_i$, $X_i=C_i \otimes D_i$, i=1, 2, and the matrix $C_i$ or the matrix $D_i$ is a function of the one or more intermediate matrices.

In this embodiment of the present invention, user equipment determines an intermediate matrix according to a first reference signal set, and each column vector of the intermediate matrix separately corresponds to a beam. Due to a difference of locations, the user equipment feeds back different intermediate matrices, namely, different beams or beam groups; therefore, a base station can learn, according to an intermediate matrix fed back by the user equipment, a beam or a beam group in which the user equipment is located, so that interference between users in different beams that is caused by cell splitting that is formed due to multiple beams can be avoided by means of dynamic or semi-static scheduling of beams; and the user equipment determines a precoding matrix according to a second reference signal set, where a matrix $C_i$ or a matrix $D_i$ in a structure of the precoding matrix is a function of the one or more intermediate matrices, so that the user equipment further optimizes precoding based on the beam or beam group in which the user equipment is located. In this way, based on the precoding matrix of the intermediate matrix, gains of the foregoing cell splitting are conveniently acquired, and CSI feedback accuracy is also further improved, thereby improving transmission performance of an active antenna system.

The transmitter 2200 and the receiver 2300 may be integrated into a processing chip. Alternatively, as shown in FIG. 8, the transmitter 2200 and the receiver 2300 are connected by using a bus system 1600.

In addition, the base station 2000 may further include an antenna 2100, a processor 2400, and a memory 2500. The processor 2400 may control an operation of the base station 2000, and the processor 2400 may further be referred to as a CPU (Central Processing Unit). The memory 2500 may include a read-only memory and a random access memory, and provide instructions and data to the processor 2400. A part of the memory 2500 may further include a non-volatile random access memory. Components of the user equipment 2000 are coupled together by using the bus system 2600, where the bus system 2600 not only includes a data bus, but also may further include a power bus, a control bus, a status signal bus, and the like. However, for clear description, various buses in the figure are all marked as the bus system 2600.

Optionally, as an embodiment, the first reference signal set corresponds to a subset of co-polarized antenna ports, a subset of antenna ports that are arranged in a same direction in an antenna array, or a subset of quasi co-located antenna ports.

Optionally, as another embodiment, the second reference signal set includes one or more reference signal subsets, where the reference signal subset corresponds to a subset of co-polarized antenna ports, a subset of antenna ports that are arranged in a same direction in an antenna port array, or a subset of quasi co-located antenna ports.

Optionally, as another embodiment, the first reference signal set is a subset of the second reference signal set.

Optionally, as another embodiment, the first reference signal set is associated with a cell identity.

Optionally, as another embodiment, that the matrix $C_i$ or the matrix $D_i$ is a function of the one or more intermediate matrices includes that:

the $k^{th}$ column $c_k$ of the matrix $C_i$ meets formula (4) or the $k^{th}$ column $d_k$ of the matrix meets formula (5), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1}=\alpha_{k,N_V}$, $\alpha_{k,2}=\alpha_{k,N_V-1}, \ldots, \beta_{k,1}=\alpha_{k,N_H}, \alpha_{k,2}=\alpha_{k,N_H-1}, \ldots, \alpha_{k,1}, \alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (6) or formula (7) and formula (8); or the phases $\varphi_{k,1}, \varphi_{k,2}, \ldots, \varphi_{k,N_H}$ meet (9) or (10) and (11); values of phase shifts $\theta_{\textit{offset}}$ and $\vartheta_{\textit{offset}}$ may be $$\pm\frac{\pi}{2}, \pm\frac{\pi}{4}, \pm\frac{\pi}{8},$$

or the like; values of the phases $\phi_{k,1}, \phi_{k,2}, \ldots, \phi_{k,N_V}$ and $\varphi_{k,1}, \varphi_{k,2}, \ldots \varphi_{k,N_H}$ and the phase shifts $\theta_{offset}$ and $\vartheta_{offset}$ are not limited to the foregoing values, and are not enumerated one by one herein.

Optionally, as another embodiment, the one or more intermediate matrices that are indicated by the first index are matrices A whose each column is a DFT vector, or a column vector of a Hadamard matrix or a Householder matrix, and the matrix $C_i$ or the matrix $D_i$ is a function of the intermediate matrices A. For example, the matrix A is shown in formula (23) to formula (30).

Optionally, as another embodiment, that the matrix $C_i$ and the matrix $D_i$ are functions of the one or more intermediate matrices includes that:

the $k^{th}$ column $c_k$ of the matrix $C_i$ meets formula (13) and the $l^{th}$ column $d_l$ of the matrix $D_i$ meets formula (14), where $\alpha_{k,1}, \alpha_{k,2}, \ldots, \alpha_{k,N_V}$, and $\beta_{k,1}, \beta_{k,2}, \ldots, \beta_{k,N_H}$ are all real numbers; for example, $\alpha_{k,1}, \alpha_{k,2}, \ldots, \alpha_{k,N_V}$ or $\beta_{k,1}, \beta_{k,2}, \ldots, \beta_{k,N_H}$ is a symmetrical sequence, that is, values of $\alpha_{k,1}=\alpha_{k,N_V}$, $\alpha_{k,2}=\alpha_{k,N_V-1}, \ldots, \beta_{k,1}=\alpha_{k,N_H}, \alpha_{k,2}=\alpha_{k,N_H-1}, \ldots, \alpha_{k,1}$, $\alpha_{k,2}, \ldots, \alpha_{k,N_V}$, or $\beta_{k,1}, \beta_{k,2}, \ldots, \beta_{k,N_H}$ are all 1.

Further, the phases $\phi_{k,1}, \phi_{k,2}, \ldots, \phi_{k,N_V}$ meet formula (15) or formula (16) and formula (17); or the phases $\varphi_{k,1}, \varphi_{k,2}, \ldots, \varphi_{k,N_H}$ meet (18) or (19) and (20). Values of phase shifts $\theta_{offset}$ and $\vartheta_{offset}$ may be $$\pm\frac{\pi}{2}, \pm\frac{\pi}{4}, \pm\frac{\pi}{8},$$

or the like. Values of the phases $\phi_{k,1}, \phi_{k,2}, \ldots, \phi_{k,N_V}$ and $\varphi_{k,1}, \varphi_{k,2}, \ldots, \varphi_{k,N_H}$ and the phase shifts $\theta_{offset}$ and $\vartheta_{offset}$ are not limited to the foregoing values, and are not enumerated one by one herein.

Optionally, as another embodiment, the one or more intermediate matrices that are indicated by the first index are two matrices A and B whose each column is a DFT vector, or a column vector of a Hadamard matrix, and the matrix $C_i$ or the matrix $D_i$ is a function of the intermediate matrices A and B. For example, the matrices A and B are shown in formula (37) to formula (44) and formula (50) to formula (53).

Optionally, as another embodiment, the precoding matrix may be a matrix shown in (45) to (49).

Optionally, as another embodiment, the matrix A or a subset of a set that includes the matrix A is associated with a cell identity or has a mapping relationship with a cell identity. The association or the mapping relationship is predefined or is notified by the base station to the user equipment.

Optionally, as another embodiment, the matrices A and B or subsets of a set that includes the matrices A and B are associated with cell identities or have a mapping relationship with cell identities. The association or the mapping relationship is predefined or is notified by the base station to the user equipment.

In this embodiment of the present invention, user equipment determines an intermediate matrix according to a first reference signal set, and each column vector of the intermediate matrix separately corresponds to a beam. Due to a difference of locations, the user equipment feeds back different intermediate matrices, namely, different beams or beam groups; therefore, a base station can learn, according to an intermediate matrix fed back by the user equipment, a beam or a beam group in which the user equipment is located, so that interference between users in different beams that is caused by cell splitting that is formed due to multiple beams can be avoided by means of dynamic or semi-static scheduling of beams; and the user equipment determines a precoding matrix according to a second reference signal set, where a matrix $C_i$ or a matrix $D_i$ in a structure of the precoding matrix is a function of the one or more intermediate matrices, so that the user equipment further optimizes precoding based on the beam or beam group in which the user equipment is located. In this way, based on the precoding matrix of the intermediate matrix, gains of the foregoing cell splitting are conveniently acquired, and CSI feedback accuracy is also further improved, thereby improving transmission performance of an active antenna system.

In an actual network deployment and antenna configuration, especially, for a base station antenna condition of an AAS, the user equipment in this embodiment of the present invention selects and reports, according to a codebook scheme, a precoding matrix indicator PMI, and the base station performs precoding according to information about the PMI reported by the user equipment, thereby improving performance of a system with the foregoing antenna configuration, especially with the base station antenna configuration of an AAS.

In addition, one or more indexes are fed back based on a subset to indicate a precoding matrix, which fully uses time/frequency domain/spatial correlation of a channel, thereby reducing feedback overheads.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a precoding matrix indicator, the method comprising:
   receiving a first reference signal set sent by a base station;
   determining, based on the first reference signal set, one or more intermediate matrices, and reporting, to the base station, a first index used to indicate the determined one or more intermediate matrices;
   receiving a second reference signal set sent by the base station; and
   determining, based on the second reference signal set, a precoding matrix, and reporting, to the base station, a precoding matrix indicator used to indicate the determined precoding matrix, wherein the precoding matrix is a product W of two matrices $W_1$ and $W_2$, and $W=W_1W_2$, wherein $W_1$ is a block diagonal matrix, $W_1=\text{diag}\{X_1,X_2\}$, a block matrix $X_i$ is a Kronecker product of two matrices $C_i$ and $D_i$, $X_i=C_i \otimes D_i$, i=1, 2, and the matrix $C_i$ or the matrix $D_i$ is a function of the one or more intermediate matrices.

2. The method according to claim 1, wherein the first reference signal set is a subset of the second reference signal set.

3. The method according to claim 1, wherein that the matrix $C_i$ or the matrix $D_i$ is a function of the one or more intermediate matrices comprises that the $k^{th}$ column $c_k$ of the matrix $C_i$ meets that $$c_k = \text{diag}\{\alpha_{k,1}e^{j\phi_{k,1}}, \alpha_{k,2}e^{j\phi_{k,2}}, \ldots, \alpha_{k,N_V}e^{j\phi_{k,N_V}}\}a_l,$$

or
the $k^{th}$ column $d_k$ of the matrix $D_i$ meets that $$d_k = \text{diag}\{\beta_{k,1}e^{j\varphi_{k,1}}, \beta_{k,2}e^{j\varphi_{k,2}}, \ldots, \beta_{k,N_H}e^{j\varphi_{k,N_H}}\}a_l,$$

wherein
$a_l$ is the $l^{th}$ column vector of the intermediate matrix A, $N_V$ and $N_H$ are positive integers, $\phi_{k,1}, \phi_{k,2}, \ldots, \phi_{k,N_V}$ and $\varphi_{k,1}, \varphi_{k,2}, \ldots, \varphi_{k,N_H}$ are all phases, and $\alpha_{k,1}, \alpha_{k,2}, \ldots, \alpha_{k,N_V}$ and $\beta_{k,1}, \beta_{k,2}, \ldots, \beta_{k,N_H}$ are all real numbers.

4. The method according to claim 3, wherein $\alpha_{k,p}$, $\phi_{k,p}$, and p=1, ..., $N_V$ meet that $\alpha_{k,p}=1$, $\phi_{k,p}=(p-1)\theta$, p=1, ..., $N_V$, wherein $\theta=2\pi/N_C$, and $N_C$ is a positive integer; or
$\beta_{k,q}$, and $\varphi_{k,q}$, and q=1, ..., $N_H$ meet that $\beta_{k,q}=1$, $\varphi_{k,q}=(q-1)\vartheta$, q=1, ..., $N_H$, wherein $\vartheta=2\pi/N_D$, and $N_D$ is a positive integer.

5. The method according to claim 1, wherein the one or more intermediate matrices are matrices A whose each column is a discrete Fourier transform (DFT) vector or a column vector of a Hadamard matrix or a Householder matrix, and the matrix $C_i$ or the matrix $D_i$ is a function of the one or more intermediate matrices A.

6. The method according to claim 5, wherein the $l^{th}$ column of the matrix A is $$a_l = \begin{bmatrix} e^{j\frac{2\pi \cdot 0 \cdot l}{N}} & e^{j\frac{2\pi \cdot 1 \cdot l}{N}} & \ldots & e^{j\frac{2\pi \cdot (M-1) \cdot l}{N}} \end{bmatrix}^T,$$

wherein
$[\ ]^T$ is a matrix transpose, M and N are positive integers, and or $N_C \geq N$ or $N_D \geq N$.

7. The method according to claim 1, wherein the one intermediate matrix or the intermediate matrix A or a subset of a set that comprises the one intermediate matrix or the intermediate matrix A is associated with a cell identity or has a mapping relationship with a cell identity, and the association or the mapping relationship is predefined or is notified by the base station to user equipment.

8. A method for determining a precoding matrix indicator, the method comprising:
   sending a first reference signal set to user equipment;
   receiving a first index reported by the user equipment, wherein the first index is used to indicate one or more intermediate matrices that are determined based on the first reference signal set by the user equipment;
   sending a second reference signal set to the user equipment; and
   receiving a precoding matrix indicator reported by the user equipment, wherein the precoding matrix indicator is used to indicate a precoding matrix that is determined based on the second reference signal set by the user equipment, wherein the precoding matrix is a product W of two matrices $W_1$ and $W_2$, and $W=W_1W_2$, wherein $W_1$ is a block diagonal matrix, $W_1=\text{diag}\{X_1,X_2\}$, a block matrix $X_i$ is a Kronecker product of two matrices $C_i$ and $D_i$, $X_i=C_i \otimes D_i$, i=1, 2, and the matrix $C_i$ or the matrix $D_i$ is a function of the one or more intermediate matrices.

9. The method according to claim 8, wherein the first reference signal set is a subset of the second reference signal set.

10. The method according to claim 8, wherein that the matrix $C_i$, or the matrix $D_i$ is a function of the one or more intermediate matrices comprises that the $k^{th}$ column $c_k$ of the matrix $C_i$ meets that $$c_k = \text{diag}\{\alpha_{k,1}e^{j\phi_{k,1}}, \alpha_{k,2}e^{j\phi_{k,2}}, \ldots, \alpha_{k,N_V}e^{j\phi_{k,N_V}}\}a_m,$$

and the $l^{th}$ column $d_l$ of the matrix $D_i$ meets that $$d_l = \text{diag}\{\beta_{l,1}e^{j\varphi_{l,1}}, \beta_{l,2}e^{j\varphi_{l,2}}, \ldots, \beta_{l,N_H}e^{j\varphi_{l,N_H}}\}b_n,$$

wherein $a_l$ is $a_m$ and $b_n$ are the $m^{th}$ column vector of an intermediate matrix A and the $n^{th}$ column vector of an intermediate matrix B respectively, $N_V$ and $N_H$ are positive integers, $\phi_{k,1}, \phi_{k,2}, \ldots, \phi_{k,N_V}$ and $\varphi_{l,1}, \varphi_{l,2}, \ldots, \varphi_{l,N_H}$ are all phases, and $\alpha_{k,1}, \alpha_{k,2}, \ldots, \alpha_{k,N_V}$ and $\beta_{l,1}, \beta_{l,2}, \ldots, \beta_{l,N_H}$ are all real numbers.

11. The method according to claim 10, wherein $\alpha_{k,p}, \phi_{k,p}$, and $p=1, \ldots, N_V$ meet that $\alpha_{k,p}=1, \phi_{k,p}=(p-1)\theta, p=1, \ldots, N_V$, wherein $\theta=2\pi/N_C$, and $N_C$ is a positive integer; or $\beta_{l,q}, \varphi_{l,q}$, and $q=1, \ldots, N_H$ meet that $\beta_{l,q}=1, \varphi_{l,q}=(q-1)\vartheta$, $q=1, \ldots, N_H$, wherein $\vartheta=2\pi/N_D$, and $N_D$ is a positive integer.

12. The method according to claim 8, wherein the one or more intermediate matrices indicated by the first index are two matrices A and B whose each column is a discrete Fourier transform (DFT) vector or a column vector of a Hadamard matrix, and the matrix $C_i$ or the matrix $D_i$ is a function of the intermediate matrices A and B.

13. The method according to claim 12, wherein the $m^{th}$ column of the matrix A is $$a_m = \left[ e^{j\frac{2\pi \cdot 0 \cdot m}{N}} \quad e^{j\frac{2\pi \cdot 1 \cdot m}{N}} \quad \ldots \quad e^{j\frac{2\pi \cdot (M-1) \cdot m}{N}} \right]^T,$$

or the $n^{th}$ column of the matrix B is $$b_n = \left[ e^{j\frac{2\pi \cdot 0 \cdot n}{N'}} \quad e^{j\frac{2\pi \cdot 1 \cdot n}{N'}} \quad \ldots \quad e^{j\frac{2\pi \cdot (M'-1) \cdot n}{N'}} \right]^T,$$

wherein

M, N, M', and N' are positive integers, and $N_C \geq N$ or $N_D \geq N'$.

14. The method according to claim 8, wherein the multiple intermediate matrices or the intermediate matrices A and B or subsets of a set that comprises the multiple intermediate matrices or the intermediate matrices A and B are associated with cell identities or have a mapping relationship with cell identities, and the association or the mapping relationship is predefined or is notified by a base station to the user equipment.

15. User equipment, comprising:

a receiving unit, configured to:
receive a first reference signal set sent by a base station, and
receive a second reference signal set sent by the base station; and a feedback unit, configured to:
determine, based on the first reference signal set, one or more intermediate matrices, and report, to the base station, a first index used to indicate the determined intermediate matrix, and
determine, based on the second reference signal set, a precoding matrix, and report, to the base station, a precoding matrix indicator used to indicate the determined precoding matrix, wherein the precoding matrix is a product W of two matrices $W_1$ and $W_2$, and $W=W_1W_2$, wherein $W_1$ is a block diagonal matrix, $W_1=\text{diag}\{X_1, X_2\}$, a block matrix $X_i$ is a Kronecker product of two matrices $C_i$ and $D_i$, $X_i=C_i \otimes D_i$, i=1, 2, and the matrix $C_i$ or the matrix $D_i$ is a function of the one or more intermediate matrices.

16. The user equipment according to claim 15, wherein the first reference signal set is a subset of the second reference signal set.

17. The user equipment according to claim 15, wherein that the matrix $C_iC_i$ or the matrix $D_i$ is a function of the one or more intermediate matrices comprises that the $k^{th}$ column $c_k$ of the matrix $C_i$, meets that $$c_k = \text{diag}\{\alpha_{k,1}e^{j\phi_{k,1}}, \alpha_{k,2}e^{j\phi_{k,2}}, \ldots, \alpha_{k,N_V}e^{j\phi_{k,N_V}}\}a_l,$$

or the $k^{th}$ column $d_k$ of the matrix $D_i$ meets that $$d_k = \text{diag}\{\beta_{k,1}e^{j\varphi_{k,1}}, \beta_{k,2}e^{j\varphi_{k,2}}, \ldots, \beta_{k,N_H}e^{j\varphi_{k,N_H}}\}a_l,$$

wherein $a_l$ is the $l^{th}$ column vector of the intermediate matrix A, $N_V$ and $N_H$ are positive integers, $\phi_{k,1}, \phi_{k,2}, \ldots, \phi_{k,N_V}$ and $\varphi_{k,1}, \varphi_{k,2}, \ldots, \varphi_{k,N_H}$ are all phases, and $\alpha_{k,1}, \alpha_{k,2}, \ldots, \alpha_{k,N_V}$ and $\beta_{k,1}, \beta_{k,2}, \ldots, \beta_{k,N_H}$ are all real numbers.

18. The method according to claim 17, wherein $\alpha_{k,p}, \phi_{k,p}$, and $p=1, \ldots, N_V$ meet that $\alpha_{k,p}=1, \phi_{k,p}=(p-1)\theta, p=1, \ldots, N_V$, wherein $\theta=2\pi/N_C$, and $N_C$ is a positive integer; or $\beta_{k,q}$, and $\varphi_{k,q}$, and $q=1, \ldots, N_H$ meet that $\beta_{k,q}=1, \varphi_{k,q}=(q-1)\phi, q=1, \ldots, N_H$, wherein $\vartheta=2\pi/N_D$, and $N_D$ is a positive integer.

19. The user equipment according to claim 15, wherein that the matrix $C_iC_i$ or the matrix $D_i$ is a function of the one or more intermediate matrices comprises that the $k^{th}$ column $c_k$ of the matrix $C_i$ meets that $$c_k = \text{diag}\{\alpha_{k,1}e^{j\phi_{k,1}}, \alpha_{k,2}e^{j\phi_{k,2}}, \ldots, \alpha_{k,N_V}e^{j\phi_{k,N_V}}\}a_m,$$

and the $l^{th}$ column $d_l$ of the matrix $D_i$ meets that $$d_l = \text{diag}\{\beta_{l,1}e^{j\varphi_{l,1}}, \beta_{l,2}e^{j\varphi_{l,2}}, \ldots, \beta_{l,N_H}e^{j\varphi_{l,N_H}}\}b_n,$$

wherein $a_l$ is $a_m$ and $b_n$ are the $m^{th}$ column vector of an intermediate matrix A and the $n^{th}$ column vector of an intermediate matrix B respectively, $N_V$ and $N_H$ are positive integers, $\phi_{k,1}, \phi_{k,2}, \ldots, \phi_{k,N_V}$ and $\varphi_{l,1}, \varphi_{l,2}, \ldots, \varphi_{l,N_H}$ are all phases, and $\alpha_{k,1}, \alpha_{k,2}, \ldots, \alpha_{k,N_V}$ and $\beta_{l,1}, \beta_{l,2}, \ldots, \beta_{l,N_H}$ are all real numbers.

20. The method according to claim 19, wherein $\alpha_{k,p}, \phi_{k,p}$, and $p=1, \ldots, N_V$ meet that $\alpha_{k,p}=1, \phi_{k,p}=(p-1)\theta, p=1, \ldots, N_V$, wherein $\theta=2\pi/N_C$, and $N_C$ is a positive integer; or $\beta_{l,q}$ and $\varphi_{l,q}$, and $q=1, \ldots, N_H$ meet that $\beta_{l,q}=1, \varphi_{l,q}=(q-1)\vartheta$, $q=1, \ldots, N_H$, wherein $\vartheta=2\pi/N_D$, and $N_D$ is a positive integer.

* * * * *